US012576643B2

(12) United States Patent
Tanaka et al.

(10) Patent No.: US 12,576,643 B2
(45) Date of Patent: Mar. 17, 2026

(54) LIQUID EJECTION APPARATUS, METHOD FOR CONTROLLING LIQUID EJECTION APPARATUS, AND STORAGE MEDIUM

(71) Applicant: CANON KABUSHIKI KAISHA, Tokyo (JP)

(72) Inventors: Fumi Tanaka, Kanagawa (JP); Yuzuru Ishida, Kanagawa (JP); Yoshinori Misumi, Tokyo (JP); Keiji Tomizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 18/532,229

(22) Filed: Dec. 7, 2023

(65) Prior Publication Data

US 2024/0208225 A1 Jun. 27, 2024

(30) Foreign Application Priority Data

Dec. 21, 2022 (JP) ................................. 2022-204293

(51) Int. Cl.
*B41J 2/165* (2006.01)
*B41J 2/14* (2006.01)

(52) U.S. Cl.
CPC ....... *B41J 2/16517* (2013.01); *B41J 2/14016* (2013.01)

(58) Field of Classification Search
CPC .............. B41J 2/165; B41J 2002/14185; B41J 2/14145; B41J 2/1404; B41J 2/14024; B41J 2202/12; B41J 2202/19; B41J 2202/22; B41J 2/14072; B41J 2/14129; B41J 2202/20
See application file for complete search history.

(56) References Cited

U.S. PATENT DOCUMENTS

| | | | |
|---|---|---|---|
| 6,994,417 | B2 | 2/2006 | Murayama |
| 7,753,467 | B2 | 7/2010 | Misumi |
| 7,950,769 | B2 | 5/2011 | Sakai |
| 8,123,330 | B2 | 2/2012 | Sakai |
| 8,491,087 | B2 | 7/2013 | Sakai |
| 8,985,721 | B2 | 3/2015 | Tomizawa |
| 9,701,130 | B2 | 7/2017 | Misumi |

(Continued)

FOREIGN PATENT DOCUMENTS

| | | |
|---|---|---|
| JP | 2008-105364 A | 5/2008 |
| JP | 2014-131867 A | 7/2014 |

*Primary Examiner* — Thinh H Nguyen
(74) *Attorney, Agent, or Firm* — Venable LLP

(57) ABSTRACT

The present disclosure aims to obtain stable ejection characteristics after performing removal of burnt-on deposits. An embodiment of the present invention is a liquid ejection apparatus including: a liquid ejection head having an ejection port from which to eject liquid, a thermal action unit having a heat generating element for generating energy required to eject the liquid, and a first protective layer provided to block a contact between the thermal action unit and the liquid and formed of a material containing metal that dissolves into the liquid by having an electrochemical reaction with the liquid; and a control unit configured to perform a cleaning process to remove burnt-on deposits accumulating on the first protective layer by dissolving the first protective layer through an electrochemical reaction and perform an aging process to accumulate burnt-on deposits onto the first protective layer after the cleaning process.

19 Claims, 17 Drawing Sheets

(56) References Cited

U.S. PATENT DOCUMENTS

| | | | | |
|---|---|---|---|---|
| 10,994,532 | B2 | 5/2021 | Ishida | |
| 10,994,543 | B2 * | 5/2021 | Kameshima | B41J 2/1404 |
| 2007/0146428 | A1 | 6/2007 | Sakai | |
| 2011/0199421 | A1 | 8/2011 | Sakai | |
| 2012/0105537 | A1 | 5/2012 | Sakai | |
| 2014/0152725 | A1 | 6/2014 | Tomizawa | |
| 2023/0070795 | A1 | 3/2023 | Tomizawa | |

* cited by examiner

LIQUID EJECTION APPARATUS, METHOD FOR CONTROLLING LIQUID EJECTION APPARATUS, AND STORAGE MEDIUM

BACKGROUND

Field

The present disclosure relates to a liquid ejection apparatus, a method for controlling the liquid ejection apparatus, and a storage medium, and particularly to an aging method for an inkjet printing apparatus that performs printing by ejecting ink to a printing medium.

Description of the Related Art

The inkjet printing method, which is one of printing methods employed by printing apparatuses such as multifunction printers, is a non-impact printing method. The inkjet printing method is widely employed because it enables low-noise, high-density, and high-speed printing.

An inkjet printing apparatus has a driving mechanism for driving a carrier on which an inkjet head is mounted, a conveyance mechanism for conveying a printing medium such as printing paper, and a control configuration for controlling these mechanisms.

Methods for generating energy for ejecting ink from ejection ports of a printhead include a method that applies ink using electromechanical conversion elements such as piezoelectric elements and a method that utilizes pressure of air bubbles produced by heating the ink through application of electromagnetic waves such as laser beams. There is also a method that produces air bubbles by heating ink using electrothermal conversion elements (hereinafter called "heaters") having heat generating resistors.

The ejection speed of a printhead using the heaters may significantly change because as the heaters heat ink, the ink burns and sticks to their surfaces. Ink used for such a printhead often has a dye-based or pigment-based coloring material, and many of such coloring materials are insoluble or poorly-soluble in water. Because such an insoluble or poorly-soluble substance burns and sticks to the heaters described above, it is said that ejection characteristics such as ejection speed easily change.

In a case where ink that easily burns and sticks as described above is ejected with heaters having almost no burnt-on deposits on their surface layers because, e.g., the head has just been attached, it is known that burning and sticking of the ink onto the heaters significantly change the initial ejection characteristics (e.g., the ejection speed decreases). This change from the initial ejection characteristics may produce a negative effect on a printed image, such as, for example, thin lines printed due to displacement of ink landing positions, distortion of text, or change in color tone.

To address this problem, Japanese Patent Laid-Open No. 2014-131867 discloses performing, prior to printing on a paper surface, a preliminary ink ejection process contributing to no printing on a paper surface (hereinafter referred to as aging, preliminary ejection, or the like). Aging stabilizes heater surfaces by forming a certain amount of burnt-on ink on the heater surfaces to uniformize the burnt-on ink on the heater surfaces (or balance attachment and detachment of burnt-on ink). Aging can thus mitigate change from the initial ejection characteristics.

Meanwhile, Japanese Patent Laid-Open No. 2008-105364 discloses a head having an upper protective layer in a region including a thermal action unit of a heater, the upper protective layer being disposed in an electrically connectable manner so as to serve as an electrode for causing an electrochemical reaction with ink. This upper protective layer is formed of a material which contains metal which dissolves upon an electrochemical reaction and which, upon being heated, does not form an oxide film that hinders the dissolution. The surface layer of the upper protective layer thus dissolves due to a reliable electrochemical reaction, which makes it possible to remove the burnt-on deposits on the thermal action unit evenly and reliably.

SUMMARY

However, the patent literature described above has the following problem: because heaters removed of burnt-on deposits have no or little burnt-on deposits on the surface layers of the heaters, the ejection characteristics also change significantly like in the initial state.

In view of the above problem, the present disclosure aims to obtain stable ejection characteristics after performing removal of burnt-on deposits.

An embodiment of the present invention is a liquid ejection apparatus including: a liquid ejection head having an ejection port from which to eject liquid, a thermal action unit having a heat generating element for generating energy required to eject the liquid, and a first protective layer provided to block a contact between the thermal action unit and the liquid and formed of a material containing metal that dissolves into the liquid by having an electrochemical reaction with the liquid; and a control unit configured to perform a cleaning process to remove burnt-on deposits accumulating on the first protective layer by dissolving the first protective layer through an electrochemical reaction and perform an aging process to accumulate burnt-on deposits onto the first protective layer after the cleaning process.

Further features of the present invention will become apparent from the following description of exemplary embodiments with reference to the attached drawings.

DESCRIPTION OF THE EMBODIMENTS

Embodiments of the present disclosure are described below with reference to the drawings. However, what is described below is not intended to limit the contents of the present disclosure more than necessary. Although a liquid ejection apparatus having what is called a line-type head having a length corresponding to the width of a printing medium is used as an example in the following description, the concept of the present disclosure can also be applied to what is called a serial-type liquid ejection apparatus, which performs printing while scanning relative to a printing medium. As a configuration of a serial-type liquid ejection apparatus, for example, one black-ink printing element substrate and one color-ink printing element substrate may be installed. However, the present disclosure is not limited to this mode, and a short line head shorter than the width of a printing medium may be formed in which a plurality of printing element substrates are disposed so that ejection ports overlap with one another in the ejection port array direction and be scanned relative to a printing medium. Also, although the printing apparatuses of the present embodiments are a circulation-type inkjet printing apparatus that circulates liquid such as ink between a tank and a liquid ejection apparatus, they may be a non-circulation type.

Note that an inkjet head is referred to simply as a "(print)head" herein. Also, a head that ejects liquid such as ink is referred to as a "liquid ejection head." Further, an ink, a processing liquid for improving the fixation of an ink, and a processing liquid for improving glossiness are collectively referred to as "liquid".

First Embodiment

<Inkjet Printing Apparatus>

Figure 1:
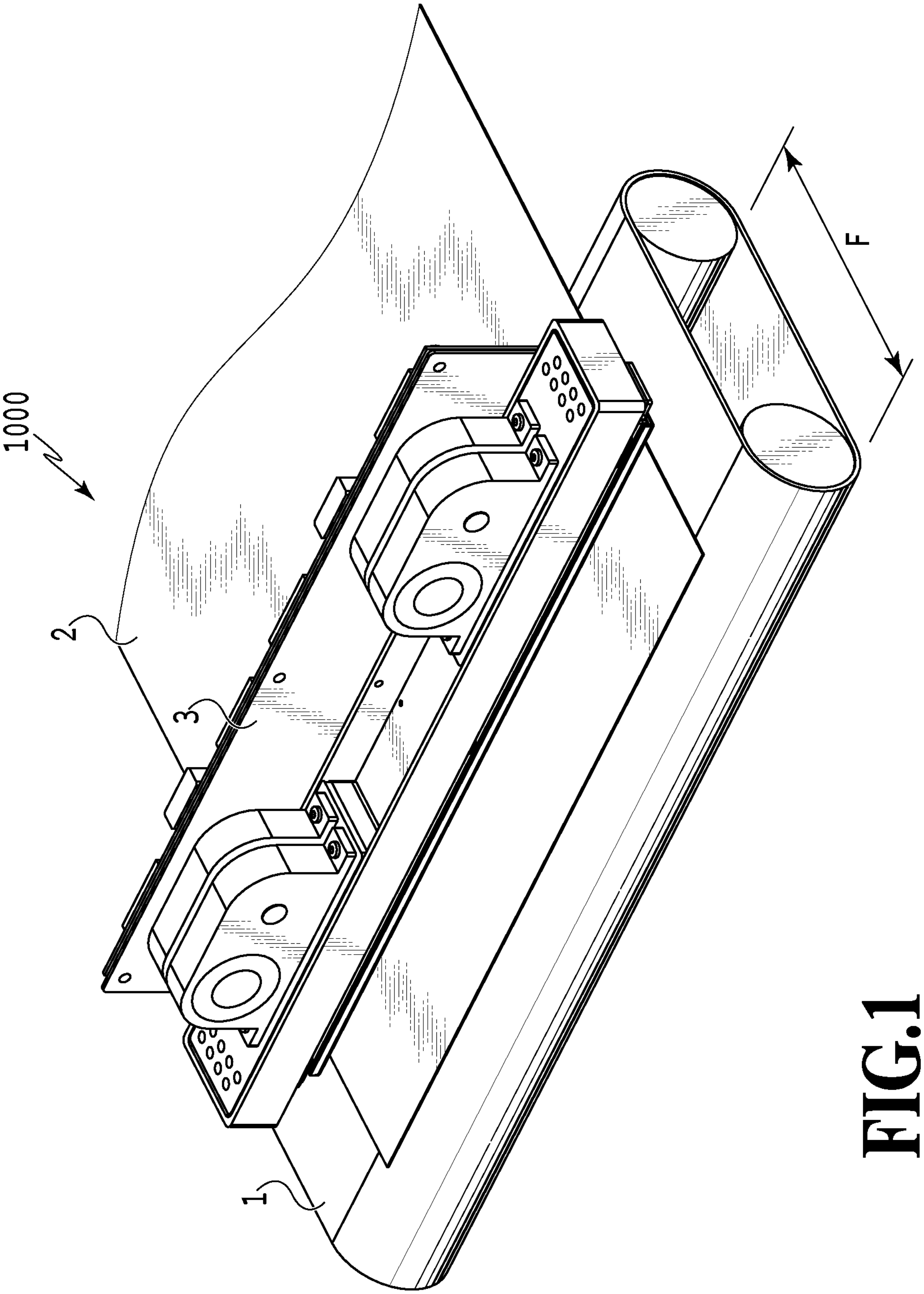
FIG. 1 is a diagram showing a schematic configuration of a printing apparatus.

FIG. 1 shows a schematic configuration of a liquid ejection apparatus according to the present embodiment, or specifically an inkjet printing apparatus 1000 (hereinafter also referred to as a printing apparatus) that performs printing by ejecting ink. The printing apparatus 1000 has a conveyance unit 1 that conveys a printing medium 2 and a line-type liquid ejection head 3 disposed to be substantially orthogonal to the direction in which a printing medium is conveyed. The printing apparatus 1000 is a line-type printing apparatus that performs continuous printing with one pass while continuously or intermittently conveying a plurality of printing media 2. The printing medium 2 is not limited to a cut sheet and may be a roll of continuous paper. The liquid ejection head 3 is capable of full-color printing using CMYK (cyan, magenta, yellow, and black) inks. In the liquid ejection head 3, a liquid supply unit forming a supply path for supplying ink to the liquid ejection head, a main tank, and a buffer tank are fluidically connected, as will be described later (see FIG. 2). Also, the liquid ejection head 3 is electrically connected to an electric control unit that sends power and ejection control signals to the liquid ejection head 3. Liquid paths and electric signal paths in the liquid ejection head 3 will be described later.

<First Circulation Path>

Figure 2:
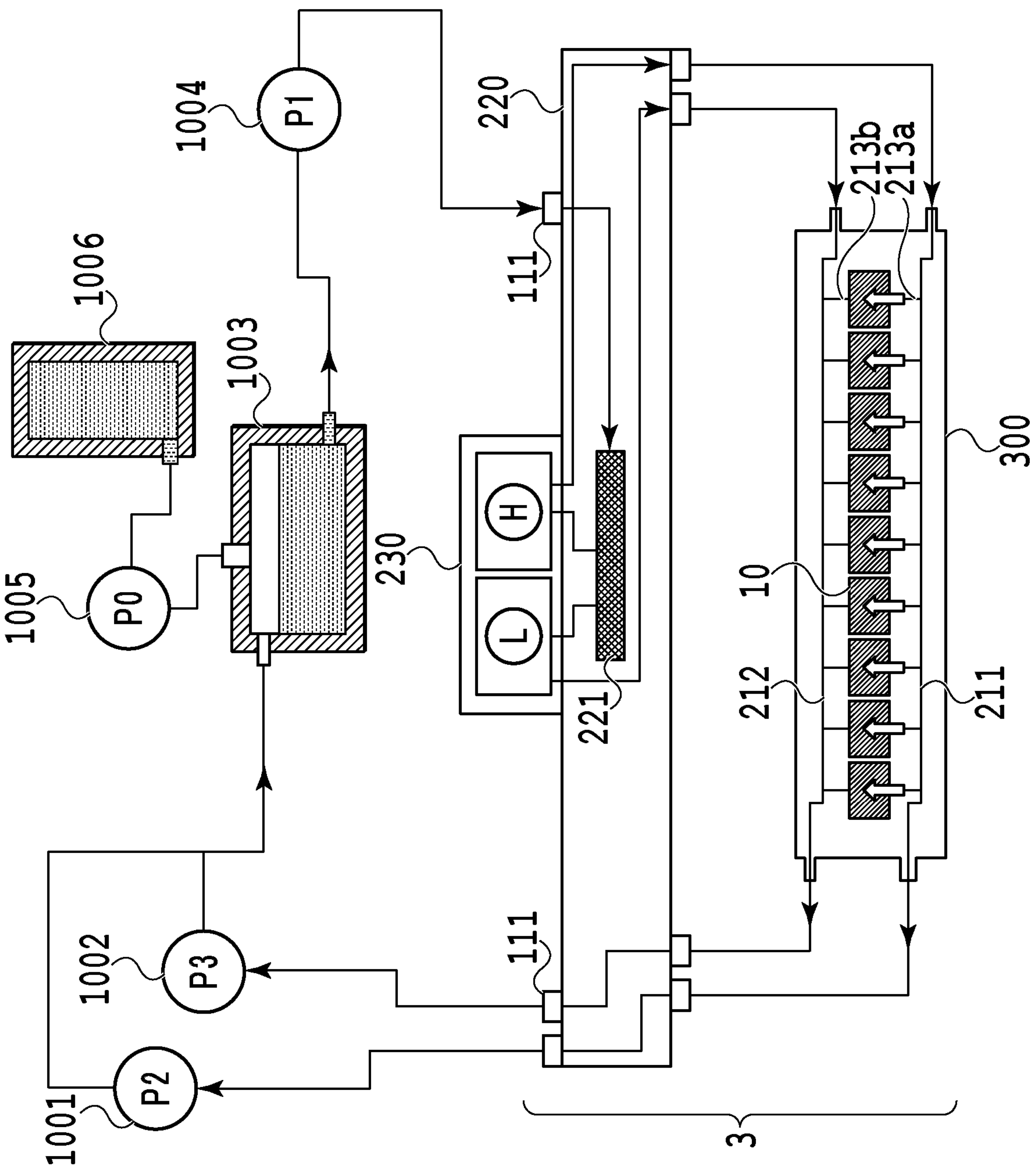
FIG. 2 is a schematic diagram showing a first circulation path.

FIG. 2 is a schematic diagram showing a first circulation path which is one mode of a circulation path applied to the printing apparatus according to the present embodiment. As shown in FIG. 2, the liquid ejection head 3 is fluidically connected to a first circulation pump (high-pressure side) 1001, a first circulation pump (low-pressure side) 1002, a buffer tank 1003, and the like. Although FIG. 2 shows only a path along which one of the CMYK inks flows in order to simplify the illustration, it is to be noted that in actuality, circulation paths for four colors are provided in the liquid ejection head 3 and the main body of the printing apparatus.

The buffer tank 1003, which is a sub-tank connected to a main tank 1006, has an atmosphere communication port (not shown) allowing the inside and the outside of the tank to communicate with each other and is capable of expelling air bubbles in ink to the outside. The buffer tank 1003 is also connected to a replenishment pump 1005. After ink is consumed by the liquid ejection head 3, the replenishment pump 1005 transfers ink from the main tank 1006 to the buffer tank 1003 by an amount compensating for the consumed ink. Ink is consumed by the liquid ejection head 3 by being ejected (discharged) from ejection ports of the liquid ejection head in the events of, for example, printing or suction recovery involving ink ejection.

The two first circulation pumps 1001, 1002 have a role in drawing ink from liquid connection components 111 of the liquid ejection head 3 and passing it to the buffer tank 1003. As the first circulation pumps, positive displacement pumps, which have quantitative pumping capability, are preferable. Specific examples include a tube pump, a gear pump, a diaphragm pump, and a syringe pump, but also, for example, a mode may be employed in which a typical constant flow valve or relief valve is disposed at an exit of a pump to achieve a constant flow rate. While the liquid ejection head 3 is driven, the first circulation pump (high-pressure side) 1001 and the first circulation pump (low-pressure side) 1002 allow a certain quantity of ink to flow inside a shared supply flow channel 211 and a shared collection flow channel 212. The flow amount here is preferably set to be equal to or above a flow amount such that the difference in temperature between printing element substrates 10 in the liquid ejection head 3 does not affect print quality. However, due to the influence by a pressure drop in the flow channels in a liquid ejection unit 300, setting too large a flow amount makes the difference in negative pressure between the printing element substrates 10 too large and consequently causes density unevenness on the image. For this reason, it is preferable that the flow amount be set considering the difference in temperature and the difference in negative pressure between the printing element substrates 10.

A negative pressure control unit 230 is provided at a mid-point on a path connecting a second circulation pump 1004 and the liquid ejection unit 300. Thus, the negative pressure control unit 230 has the function of operating to maintain the pressure on a downstream side (i.e., the liquid ejection unit 300 side) of the negative pressure control unit 230 at a preset certain pressure even in a case where the flow amount in the circulation system fluctuates due to differences in printing duties. Any mechanism may be used as two pressure adjustment mechanisms forming the negative pressure control unit 230 as long as they can control pressure downstream of the mechanism itself within a certain range of fluctuations from a desired set pressure. For example, a mechanism similar to what is called a "pressure reducing regulator" can be employed. In a case where a pressure reducing regulator is used, as shown in FIG. 2, it is preferable that the upstream side of the negative pressure control unit 230 be pressurized by the second circulation pump 1004 via a liquid supply unit 220. This can mitigate the influence of the hydraulic head pressure that the buffer tank 1003 has on the liquid ejection head 3, which provides a higher degree of flexibility in the layout of the buffer tank 1003 in the printing apparatus 1000. The second circulation pump 1004 needs only to be one that has a certain lift pressure or above within the range of ink circulation flow amount used in driving of the liquid ejection head 3, and a turbo pump, a positive displacement pump, or the like can be used. Specifically, a diaphragm pump or the like can be employed. Also, instead of the second circulation pump 1004, for example, a hydraulic head tank disposed with a certain hydraulic head difference with respect to the negative pressure control unit 230 can be employed as well.

As shown in FIG. 2, the negative pressure control unit 230 has two pressure adjustment mechanisms for which control pressures different from each other are set. Of these two negative pressure adjustment mechanisms, the one for which a relatively high pressure is set (denoted as H in FIG. 2) is connected to the shared supply flow channel 211 in the liquid ejection unit 300 through the liquid supply unit 220, and the one for which a relatively low pressure is set (denoted as L in FIG. 2) is connected to the shared collection flow channel 212 through the liquid supply unit 220.

The liquid ejection unit 300 is provided with individual supply flow channels 213*a* and individual collection flow channels 213*b* communicating with the respective printing element substrates 10 and with the shared supply flow channel 211 and the shared collection flow channel 212, respectively. Because the individual supply flow channels 213*a* and 213*b* communicate with the shared supply flow channel 211 and the shared collection flow channel 212, flows are generated in which part of the ink flows from the shared supply flow channel 211 to the shared collection flow channel 212 through internal flow channels inside the printing element substrates 10 (the arrows in FIG. 2). This is because there is a difference in pressure between the two shared flow channels due to the connection of the pressure adjustment mechanism H to the shared supply flow channel 211 and the connection of the pressure adjustment mechanism L to the shared collection flow channel 212.

In this way, in the liquid ejection unit 300, while ink is passed through each of the shared supply flow channel 211 and the shared collection flow channel 212, part of the ink passes through the printing element substrates 10. Due to the ink flows thus generated, heat generated at each printing element substrate 10 can be discharged to the outside of the printing element substrate 10 along the flows in the shared supply flow channel 211 and the shared collection flow channel 212. Also, with this configuration, while the liquid ejection head 3 is printing, ink can flow also through ejection ports and pressure chambers not currently contributing to the printing, making it possible to reduce thickening of the like at those sites. Also, thickened ink or foreign matters in ink can be discharged to the shared collection flow channel 212. Thus, the liquid ejection head 3 of the present embodiment can print high quality images at high speed.

<Second Circulation Path>

Figure 3:
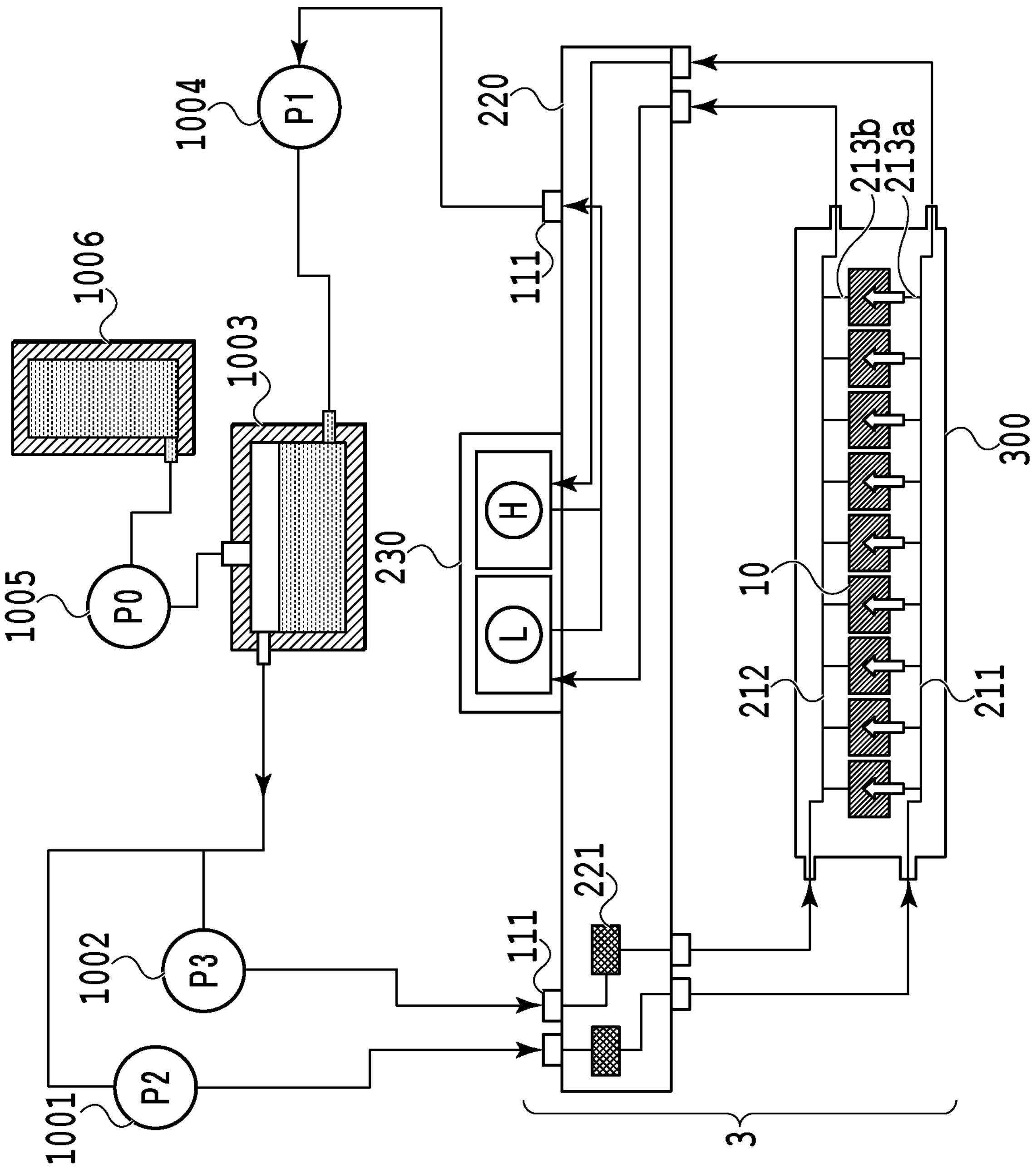
FIG. 3 is a schematic diagram showing a second circulation path.

FIG. 3 is a schematic diagram showing a second circulation path, different from the first circulation path described above, as a circulation path applied to the printing apparatus of the present embodiment. The second circulation path is different from the first circulation path mainly in the following points.

First, the two pressure adjustment mechanisms forming the negative pressure control unit 230 both have mechanisms that control pressure upstream of the negative pressure control unit 230 within a certain range of fluctuations from a desired set pressure (a mechanism component operating in the same way as what is called a "back pressure regulator"). Also, the second circulation pump 1004 acts as a negative-pressure source that reduces pressure at the downstream side of the negative pressure control unit 230. Further, the first circulation pump (high-pressure side) 1001 and the first circulation pump (low-pressure side) 1002 are disposed upstream of the liquid ejection head, and the negative pressure control unit 230 is disposed downstream of the liquid ejection head.

The negative pressure control unit 230 in the second circulation path operates so that the pressure on the upstream side (i.e., the liquid ejection unit 300 side) of the negative pressure control unit 230 itself may fluctuate within a certain range even in a case where the flow amount in the circulation system fluctuates due to differences in printing duties while the liquid ejection head 3 is printing. For example, the pressure fluctuations are controlled to stay within a certain range from a preset pressure. As shown in FIG. 3, the downstream side of the negative pressure control unit 230 is preferably pressurized by the second circulation pump 1004 via the liquid supply unit 220. This can mitigate the influence of the hydraulic head pressure that the buffer tank 1003 has on the liquid ejection head 3, which provides a higher degree of flexibility in the layout of the buffer tank 1003 in the printing apparatus 1000. Also, instead of the second circulation pump 1004, for example, a hydraulic head tank disposed with a certain hydraulic head difference with respect to the negative pressure control unit 230 can be employed as well.

As is similar to the first circulation path, the negative pressure control unit 230 shown in FIG. 3 includes two pressure adjustment mechanisms for which control pressures different from each other are set. Of these two negative pressure adjustment mechanisms, the one for which a relatively high pressure is set (denoted as H in FIG. 3) is connected to the shared supply flow channel 211 in the liquid ejection unit 300 through the liquid supply unit 220, and the one for which a relatively low pressure is set (denoted as L in FIG. 3) is connected to the shared collection flow channel 212 through the liquid supply unit 220.

The two negative pressure adjustment mechanisms make the pressure in the shared supply flow channel 211 higher than the pressure in the shared collection flow channel 212. In this configuration, flows are generated (the arrows in FIG. 3) in which ink flows from the shared supply flow channel 211 to the shared collection flow channel 212 through the individual supply flow channels 213 and internal flow channels inside the printing element substrates 10. In this way, with the second circulation path, the same ink flows as the first circulation path are generated in the liquid ejection unit 300, but the second circulation path offers two advantages that the first circulation path does not offer.

A first advantage is that because the negative pressure control unit 230 is disposed downstream of the liquid ejection head 3 in the second circulation path, there is less concern that dust and foreign matters produced from the negative pressure control unit 230 may flow into the head. A second advantage is that the second circulation path requires a lower maximum value of a necessary flow amount supplied from the buffer tank 1003 to the liquid ejection head 3 than the first circulation path. The reason is as follows. The total of flow amounts in the shared supply flow channel 211 and the shared collection flow channel 212 during circulation in printing standby mode is denoted as A here. The value of A is defined as the minimum flow amount necessary in order for the temperature difference in the liquid ejection unit 300 to be within a desired range in adjustment of the temperature of the liquid ejection head 3 in printing standby mode. Also, an ejection flow amount in a case where ink is ejected from all the ejection ports of the liquid ejection unit 300 (full ejection) is defined as F here. Then, in the case of the first circulation path (FIG. 2), the flow amount set for the first circulation pump (high-pressure side) 1001 and the first circulation pump (low-pressure side) 1002 is A, and therefore, the maximum value of the amount of liquid that needs to be supplied to the liquid ejection head 3 for the full ejection is A+F.

Meanwhile, in the case of the second circulation path (FIG. 3), the amount of liquid needed to be supplied to the liquid ejection head 3 in a printing standby mode is the flow amount A. Also, the amount of liquid that needs to be supplied to the liquid ejection head 3 for the full ejection is the flow amount F. Then, in the case of the second circulation path, the total value of the flow amounts set for the first circulation pump (high-pressure side) 1001 and the first circulation pump (low-pressure side) 1002, i.e., the maximum value of the amount of liquid that needs to be supplied, is the larger one of A and F. Thus, as long as the liquid ejection unit 300 of the same configuration is used, the maximum value of the amount of liquid that needs to be supplied (A or F) in the second circulation path is always smaller than that (A+F) in the first circulation path. Thus, with the second circulation path, there is a higher degree of flexibility in terms of usable circulation pumps. For this reason, for example, a low-cost circulation pump with a simple configuration can be used, or the load on a cooler (not shown) placed on a path on the main-body side can be reduced, which leads to an advantage of cost reduction for the main body of the printing apparatus. This advantage is greater for a line head in which the value of A or F is relatively large, and among line heads, one with a longer length in the longitudinal direction benefits from this advantage more.

However, there is a point where the first circulation path is more advantageous than the second circulation path. More specifically, in the second circulation path where the amount of liquid flowing in the liquid ejection unit 300 is at the maximum in printing standby mode, the lower the printing duties, the higher the negative pressure applied to the nozzles. For this reason, particularly in a case where flow channel widths (the lengths in the direction orthogonal to the ink flowing direction) of the shared supply flow channel 211 and the shared collection flow channel 212 are small to have a small head width (the length of the liquid ejection head in the short-side direction), high negative pressure is applied to the nozzles for a low-duty image where unevenness is easily visible. The application of high negative pressure may increase the influence of satellite droplets. Meanwhile, in the case of the first circulation path, the timing at which high negative pressure is applied to the nozzles is during formation of a high-duty image. Thus, there is an advantage that satellite droplets, if they occur, are not easily visible and have only a small influence on the printed image. A preferable one of the two circulation paths can be selected in light of the specifications of the liquid ejection head and the main body of the printing apparatus (the ejection flow amount F, the minimum circulation flow amount A, and the resistance in the flow channels in the head).

<Configuration of the Liquid Ejection Head>

Figure 4A:
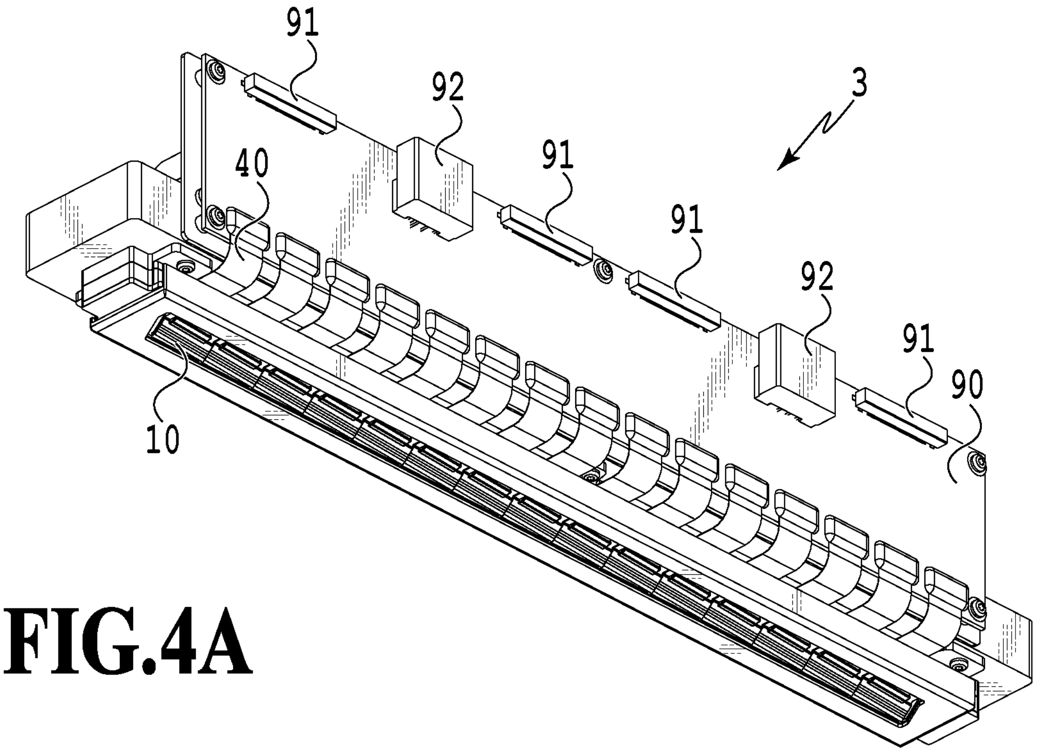
FIGS. 4A and 4B are perspective views of a liquid ejection head.
Figure 4B:
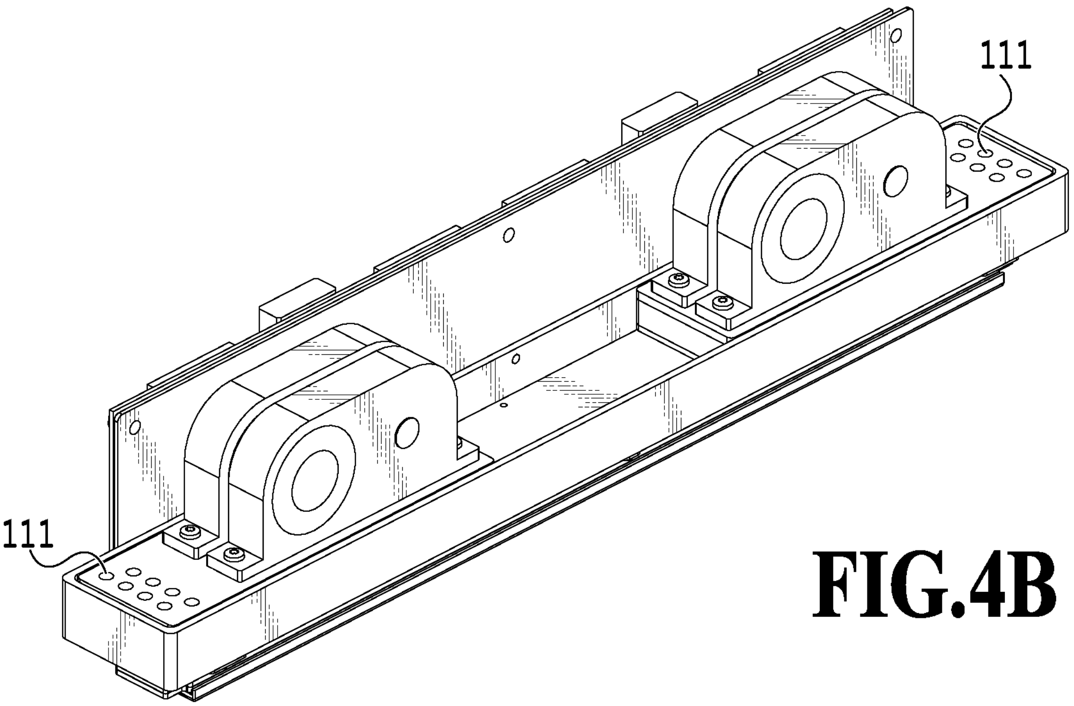

The configuration of the liquid ejection head 3 according to the first embodiment is described. FIGS. 4A and 4B are perspective views of the liquid ejection head 3 according to the present embodiment. The liquid ejection head 3 is a line-type liquid ejection head in which fifteen printing element substrates 10 each capable of ejecting inks of four colors C, M, Y, and K are arranged linearly (arranged in-line). As shown in FIG. 4A, the liquid ejection head 3 has signal input terminals 91 and power supply terminals 92 electrically connected to the printing element substrates 10 via flexible wiring substrates 40 and an electric wiring board 90. The signal input terminals 91 and the power supply terminals 92 are electrically connected to a control unit of the printing apparatus 1000. Ejection drive signals are supplied to the printing element substrates 10 via the signal input terminals 91, and power necessary for ejection is supplied to the printing element substrates 10 via the power supply terminals 92.

Wiring aggregation by electric circuits in the wiring electric wiring board 90 allows the numbers of the signal input terminals 91 and the power supply terminals 92 to be fewer than the number of the printing element substrates 10. This reduces the number of electrically connected components that need to be attached/detached at the time of assemblage of the liquid ejection head 3 to the printing apparatus 1000 or replacement of the liquid ejection head. As shown in FIG. 4B, the liquid connection components 111 provided at both end portions of the liquid ejection head 3 are connected to the liquid supply system of the printing apparatus 1000. This allows inks of four colors C, M, Y, and K to be supplied from the supply system of the printing apparatus 1000 to the liquid ejection head 3 and allows inks that have passed the liquid ejection head 3 to be collected into the supply unit of the printing apparatus 1000. In this way, the inks of the respective colors can circulate through paths in the printing apparatus 1000 and paths in the liquid ejection head 3.

Figure 5:
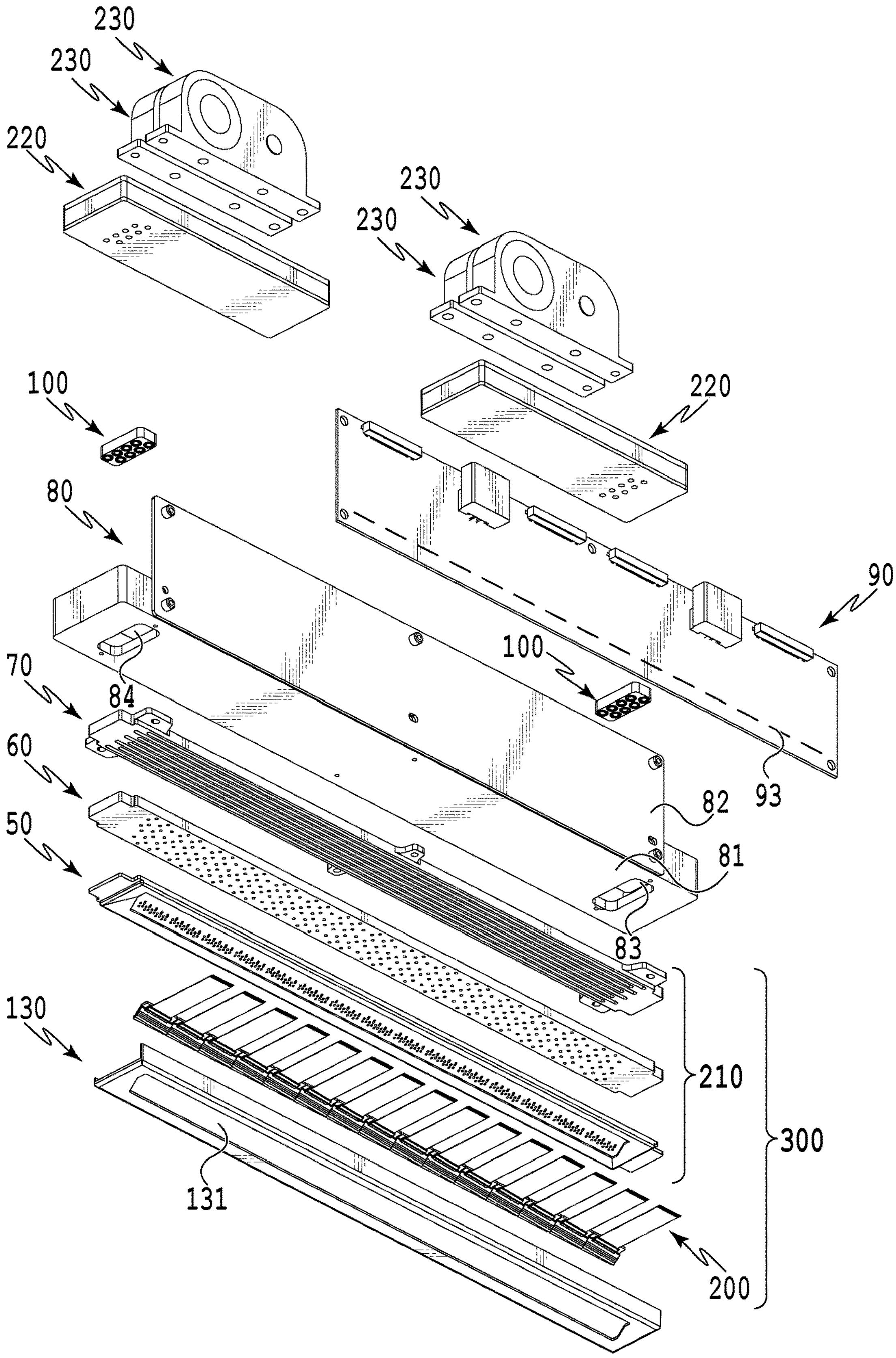
FIG. 5 is an exploded perspective view of the liquid ejection head.

FIG. 5 shows an exploded perspective view of the components and units forming the liquid ejection head 3. The liquid ejection unit 300, the liquid supply units 220, and the electric wiring board 90 are attached to a casing 80. The liquid supply units 220 are provided with the liquid connection components 111 (FIGS. 2 and 3), and also, filters 221 for the respective colors (FIGS. 2 and 3) communicating with the openings of the liquid connection components 111 are provided inside the liquid supply units 220 to remove foreign matters in the inks supplied thereto. Each of the two liquid supply units 220 is provided with the filters 221 for two colors. Inks having passed the filters 221 are supplied to the negative pressure control units 230 disposed on the respective liquid supply units 220 to correspond to the respective colors.

The negative pressure control units 230 are each a unit formed of a pressure regulation valve for a corresponding color. By the action of a valve, a spring member, and the like provided inside, the negative pressure control unit 230 greatly attenuates pressure drop change in the supply system of the printing apparatus (the supply system upstream of the liquid ejection head 3) caused by fluctuations in the ink flow amount. Thus, the negative pressure control unit 230 enables a change in negative pressure at the downstream side (the liquid ejection unit 300 side) of the pressure control unit to be stable within a certain range. The negative pressure control unit 230 for each color has therein two pressure adjustment valves for the corresponding color, as described with FIG. 2. Control pressures different from each other are set for these pressure adjustment valves. Via the liquid supply unit 220, the high-pressure side communicates with the shared supply flow channel 211 in the liquid ejection unit 300, and the low-pressure side communicates with shared collection flow channel 212.

The casing 80 is formed of a liquid ejection unit support component 81 and an electric wiring substrate support component 82. The casing 80 supports the liquid ejection unit 300 and the electric wiring board 90 and also provides rigidity to the liquid ejection head 3. The electric wiring substrate support component 82 is for supporting the electric wiring board 90 and is fixed to the liquid ejection unit support component 81 by screwing. The liquid ejection unit support component 81 has a role in correcting warpage and deformation of the liquid ejection unit 300 to keep the relative positions between the plurality of printing element substrates 10 accurate, and thus reduces streaks and unevenness on a printed product. To this end, it is preferable that the liquid ejection unit support component 81 be sufficiently rigid, and preferable materials include metal materials such as stainless steel and aluminum and ceramics such as alumina. The liquid ejection unit support component 81 is provided with openings 83, 84 for inserting joint rubbers 100. An ink supplied from the liquid supply unit 220 is led to a third flow channel member 70 forming the liquid ejection unit 300 via the joint rubbers.

The liquid ejection unit 300 has a plurality of ejection modules 200 and a flow channel member 210, and a cover member 130 is attached to the printing-medium-side surface of the liquid ejection unit 300. The cover member 130 is a member provided with an elongated opening 131 and has a frame-shaped surface as shown in FIG. 5, and the printing element substrates 10 and sealing materials 110 (FIGS. 9A and 9B) included in the ejection modules 200 are exposed from the opening 131. The frame portion surrounding the opening 131 functions as an abutment surface for a cap member that caps the liquid ejection head 3 in printing standby mode. For this reason, it is preferable to even out the irregularities and gaps on the ejection port surface of the liquid ejection unit 300 by applying an adhesive, a sealant, a filler, or the like to an area surrounding the opening 131, so that a closed space may be formed in a state where the liquid ejection head 3 is capped.

Next, the configuration of the flow channel member 210 included in the liquid ejection unit 300 is described. As shown in FIG. 5, the flow channel member 210 is stack of a first flow channel member 50, a second flow channel member 60, and the third flow channel member 70. The flow channel member 210 distributes ink supplied from the liquid supply units 220 to the ejection modules 200 and also returns ink circulating from the ejection modules 200 to the liquid supply units 220. The flow channel member 210 is screwed and fixed to the liquid ejection unit support component 81 so that warpage and deformation of the flow channel member 210 can be reduced.

Figure 6A:
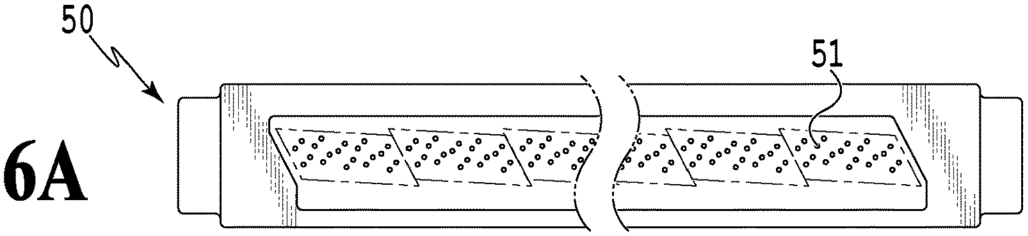
FIGS. 6A to 6F are diagrams showing a flow channel member.
Figure 6B:
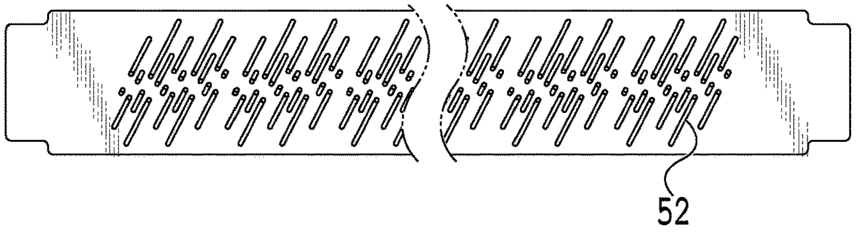
Figure 6C:
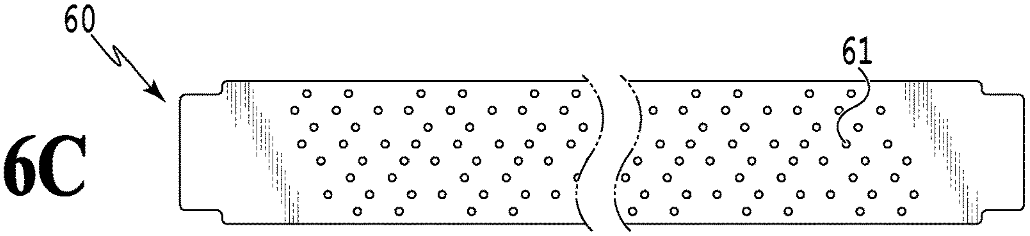
Figure 6D:
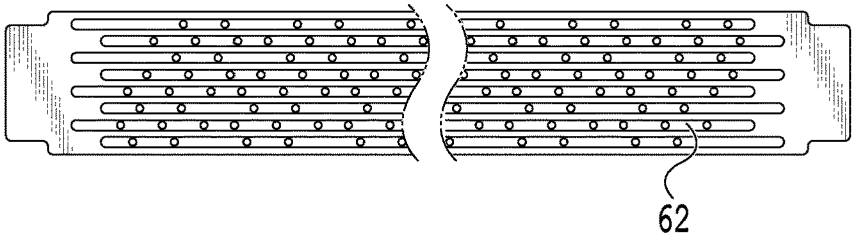
Figure 6E:
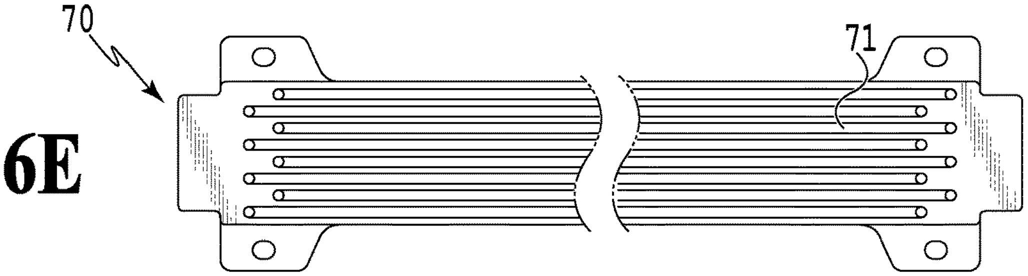
Figure 6F:
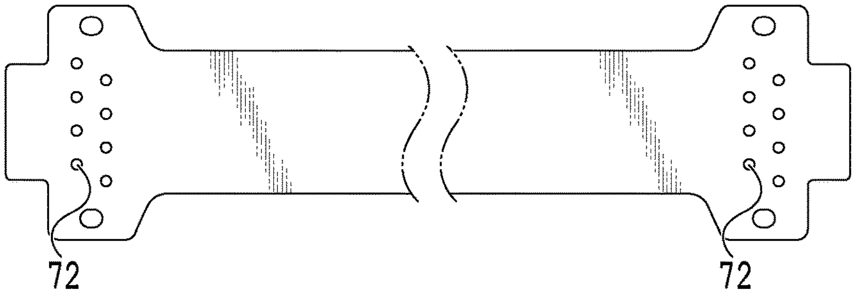
Figure 7:
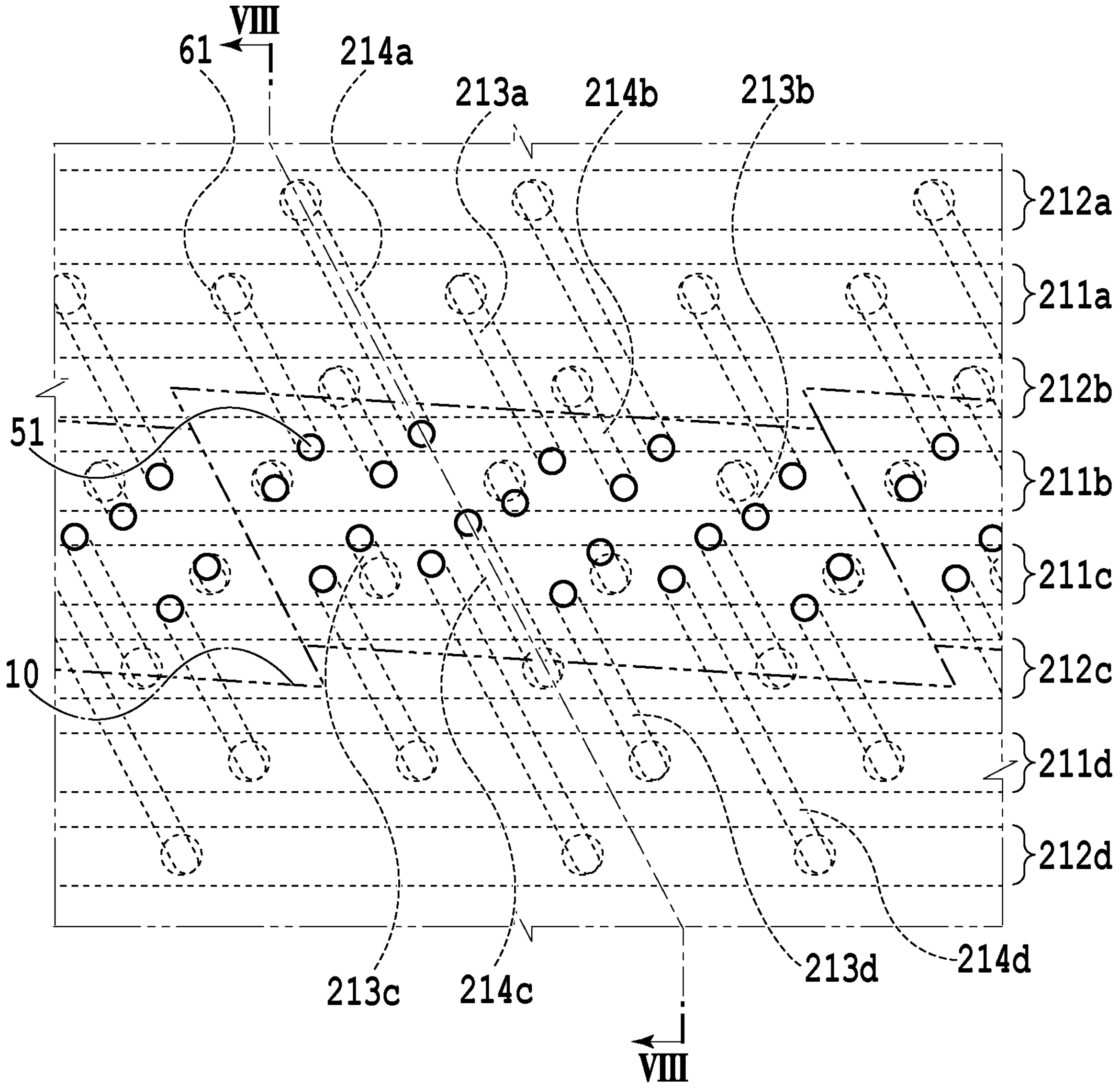
FIG. 7 is a diagram showing how flow channels in the flow channel member are connected.

FIGS. 6A to 6F are diagrams showing the front and back surfaces of each of the first to third flow channel members. FIG. 6A shows the surface of the first flow channel member 50 where the ejection modules 200 are mounted, and FIG. 6F shows the surface of the third flow channel member 70 in contact with the liquid ejection unit support component 81. The first flow channel member 50 and the second flow channel member 60 are joined to each other so that the surface shown in FIG. 6B and the surface shown in FIG. 6C, which are abutment surfaces of the respective flow channel members, face each other. The second flow channel member and the third flow channel member are joined to each other so that the surface shown in FIG. 6D and the surface shown in FIG. 6E, which are abutment surfaces of the respective flow channel members, face each other. As a result of the second flow channel member 60 and the third flow channel member 70 being joined to each other, eight shared flow channels extending in the longitudinal direction of the flow channel member are formed by shared flow channel grooves 62 and shared flow channel grooves 71 formed in the respective flow channel members. Consequently, inside the flow channel member 210, a set of the shared supply flow channel 211 and the shared collection flow channel 212 is formed for each color as shown in FIG. 7. Communication ports 72 in the third flow channel member 70 communicate with holes in the joint rubbers 100 and fluidically communicate with the liquid supply units 220. Each of the shared flow channel grooves 62 in the second flow channel member 60 has a plurality of communication ports 61 formed on the bottom surface thereof, and the communication ports 61 communicate with one end portions of individual flow channel grooves 52 of the first flow channel member 50. The individual flow channel grooves 52 of the first flow channel member 50 have communication ports 51 formed at the other end portions thereof, and via the communication ports 51, fluidically communicate with the plurality of ejection modules 200. These individual flow channel grooves 52 allow aggregation of flow channels to the center of the flow channel member.

Preferably, the first to third flow channel members have corrosion resistance to liquid and are formed of materials with a small coefficient of linear expansion. What can be used favorably as such a material is, for example, a composite material (a resin material) obtained by adding an inorganic filler such as silica microparticles or fibers to a base material such as a liquid crystal polymer (LCP), polyphenylene sulfide (PPS), or polysulfone (PSF) or alumina. The flow channel member 210 may be formed by stacking and bonding the three flow channel members, or in a case where a composite resin material is selected as the material, a bonding method involving welding may be employed.

Next, using FIG. 7, how the flow channels are connected inside the flow channel member 210 is described. FIG. 7 is a see-through view of a close-up of part of flow channels inside the flow channel member 210 formed by joining the first to third flow channel members, as seen from the surface of the first flow channel member 50 where the ejection modules 200 are mounted. The flow channel member 210 is provided with the shared supply flow channels 211 (211*a*, 211*b*, 211*c*, 211*d*) and the shared collection flow channels 212 (212*a*, 212*b*, 212*c*, 212*d*) for the respective colors extending in the longitudinal direction of the liquid ejection head 3. A plurality of individual supply flow channels (213*a*, 213*b*, 213*c*, 213*d*) formed by the individual flow channel grooves 52 are connected to the shared supply flow channels 211 for the respective colors via the communication ports 61. Also, a plurality of individual collection flow channels (214*a*, 214*b*, 214*c*, 214*d*) formed by the individual flow channel grooves 52 are connected to the shared collection flow channels 212 for the respective colors via the communication ports 61. Such a flow channel configuration allows aggregation of ink from the shared supply flow channels 211 to the printing element substrates 10 located at a center part of the flow channel member via the individual supply flow channels 213. Also, ink can be collected from the printing element substrates 10 to the shared collection flow channels 212 via the individual collection flow channels 214.

Figure 8:
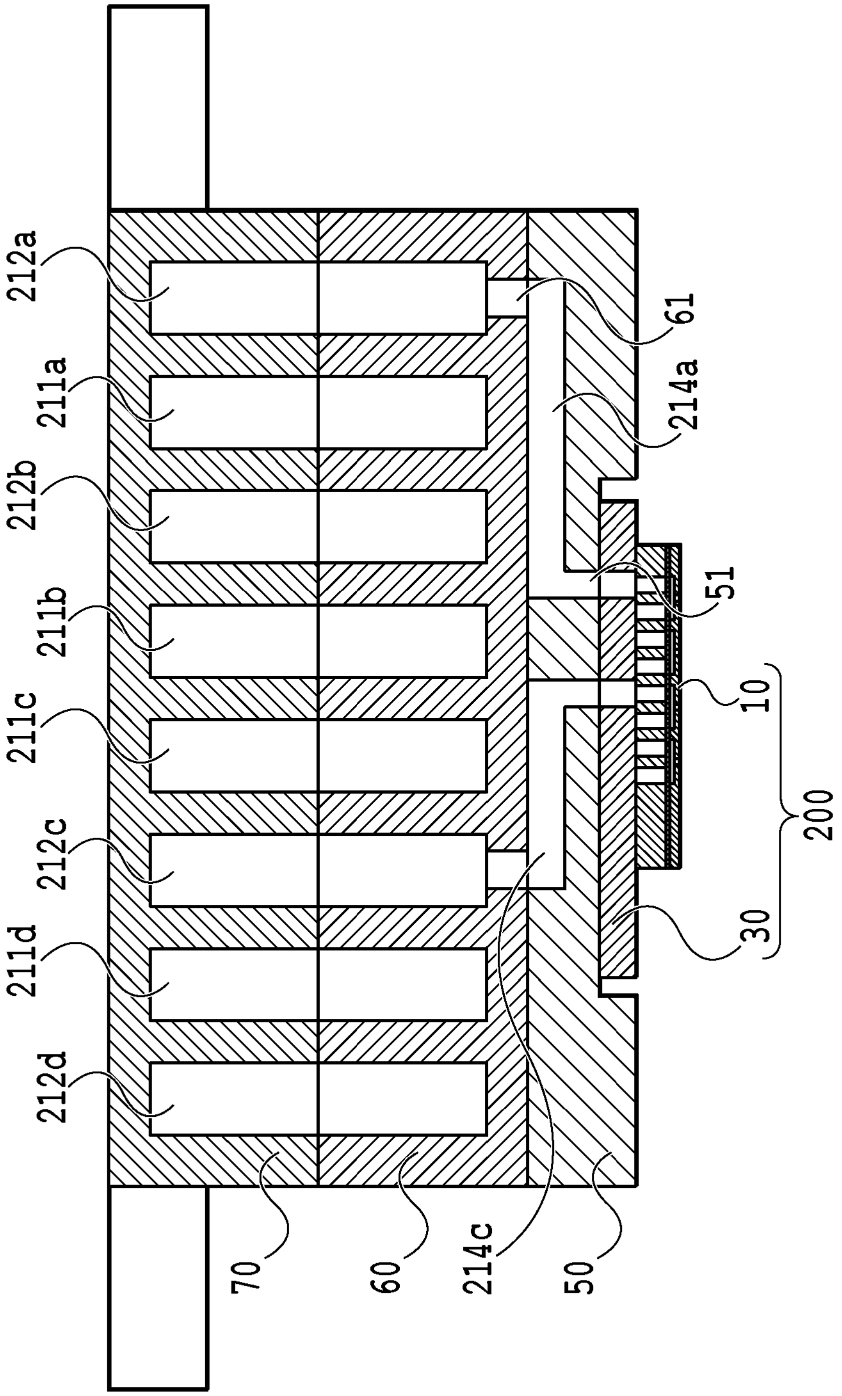
FIG. 8 is a sectional view taken along the sectional line VIII-VIII in FIG. 7.

FIG. 8 is a diagram showing a cross section along the line VIII-VIII in FIG. 7. As shown in FIG. 8, the individual collection flow channels (214*a*, 214*c*) communicate with the ejection module 200 via the communication ports 51. Although FIG. 8 shows only the individual collection flow channels (214*a*, 214*c*), in a different cross section, the individual supply flow channels 213 communicate with the ejection module 200 as shown in FIG. 7. A flow channel is formed in a support member 30 and the printing element substrate 10 that are included in each ejection module 200 in order to supply ink from the first flow channel member 50 to a printing element 15 (FIG. 10B) provided at the printing element substrate 10. Another flow channel is formed in the support member 30 and the printing element substrate 10 in order to collect (circulate) part or all of the ink supplied to the printing element 15 to the first flow channel member 50. The shared supply flow channel 211 for each color is connected to the negative pressure control unit 230 (high-pressure side) for the corresponding color via the liquid supply unit 220, whereas the shared collection flow channel 212 is connected to the negative pressure control unit 230 (low-pressure side) via the liquid supply unit 220. This negative pressure control unit 230 is configured to generate differential pressure (pressure difference) between the shared supply flow channel 211 and the shared collection flow channel 212. Thus, in the liquid ejection head of the present embodiment in which the flow channels are connected as shown in FIGS. 7 and 8, the following flow is generated for each color: the shared supply flow channel 211 to the individual supply flow channel 213*a*, to the printing element substrate 10, to the individual collection flow channel 213*b*, and then to the shared collection flow channel 212.

<Ejection Module>

Figure 9A:
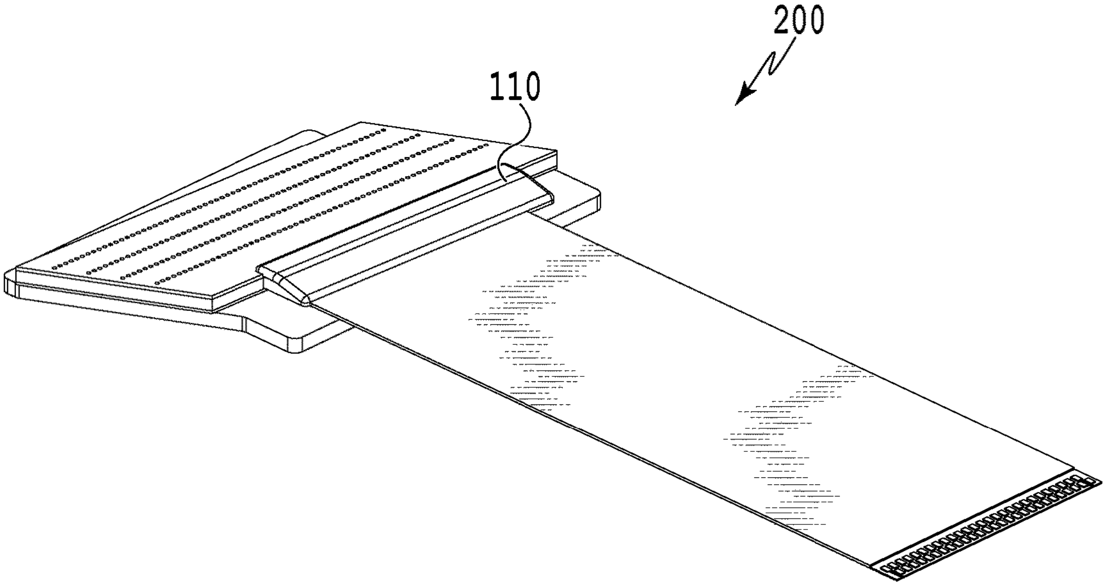
FIGS. 9A and 9B are diagrams showing an ejection module.
Figure 9B:
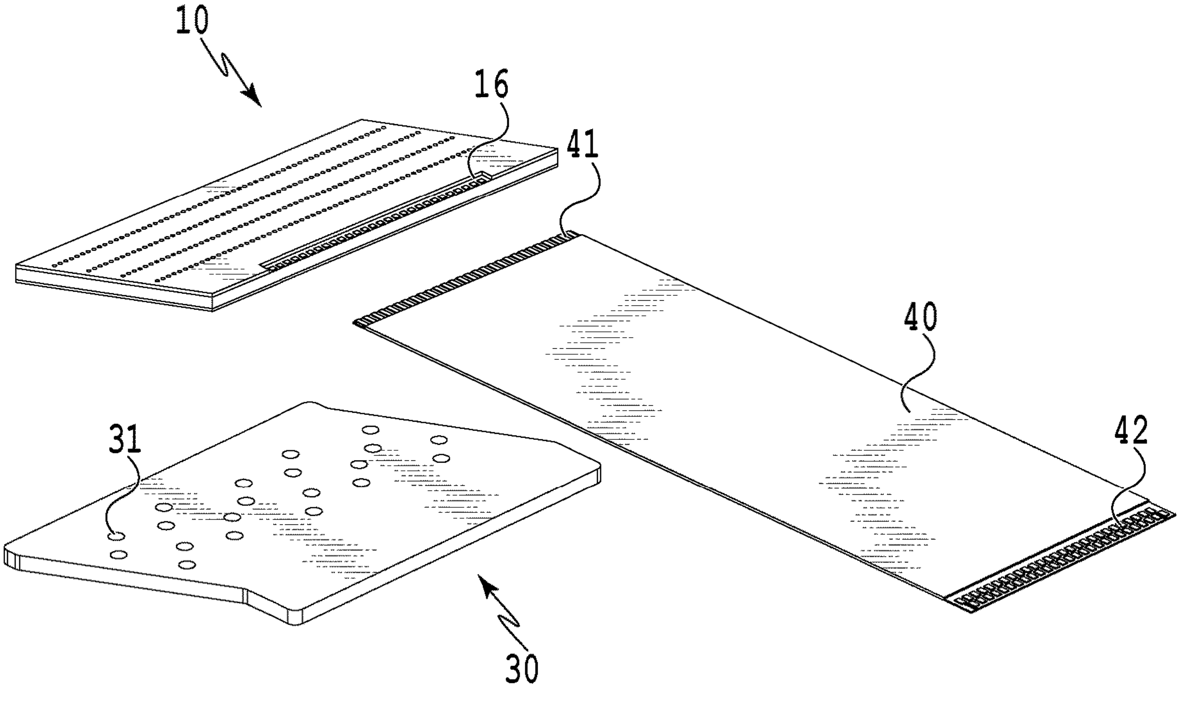

FIG. 9A shows a perspective view of a single ejection module 200, and FIG. 9B shows an exploded view thereof. The ejection module 200 is manufactured in the following method. First, the printing element substrate 10 and the flexible wiring substrate 40 are bonded onto the support member 30 already provided with liquid communication ports 31. After that, terminals 16 on the printing element substrate 10 and terminals 41 on the flexible wiring substrate 40 are electrically connected by wire bonding, and then, the wire bonding portion (electrically connected portion) is covered and sealed by the sealing material 110. Terminals 42 at the flexible wiring substrate 40 at the opposite side from the printing element substrate 10 are electrically connected to a connection terminal 93 (see FIG. 5) at the electric wiring board 90. The support member 30 serves not only as a support that supports the printing element substrate 10 but also as a flow channel member that allows the printing element substrate 10 and the flow channel member 210 to fluidically communicate with each other. For this reason, the support member 30 is preferably one that has high flatness and can be bonded to the printing element substrate with sufficiently high reliability. Preferable materials include, for example, alumina or a resin material.

<Structure of the Printing Element Substrate>

Figure 10A:
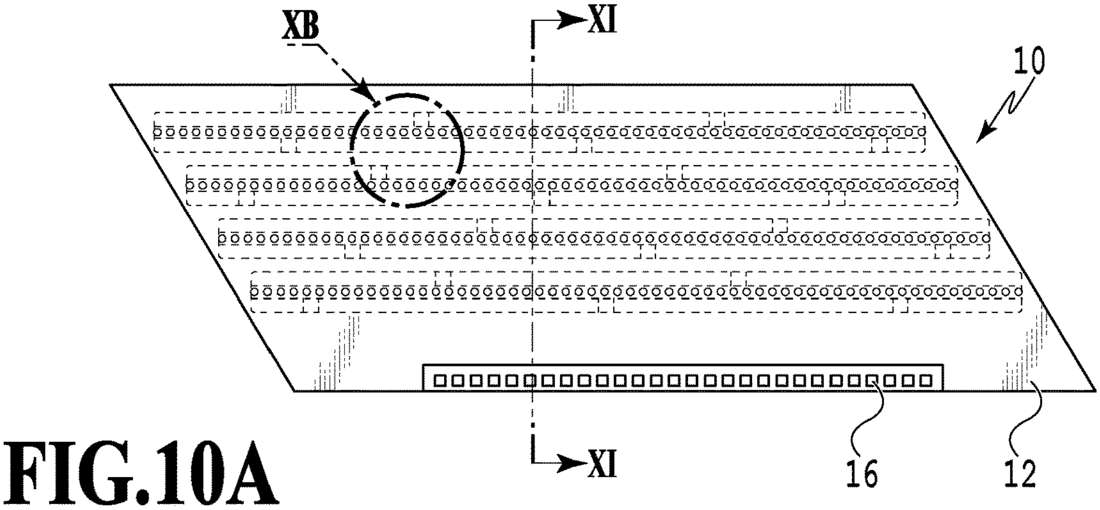
FIGS. 10A to 10C are diagrams showing the structure of a printing element substrate.
Figure 10B:
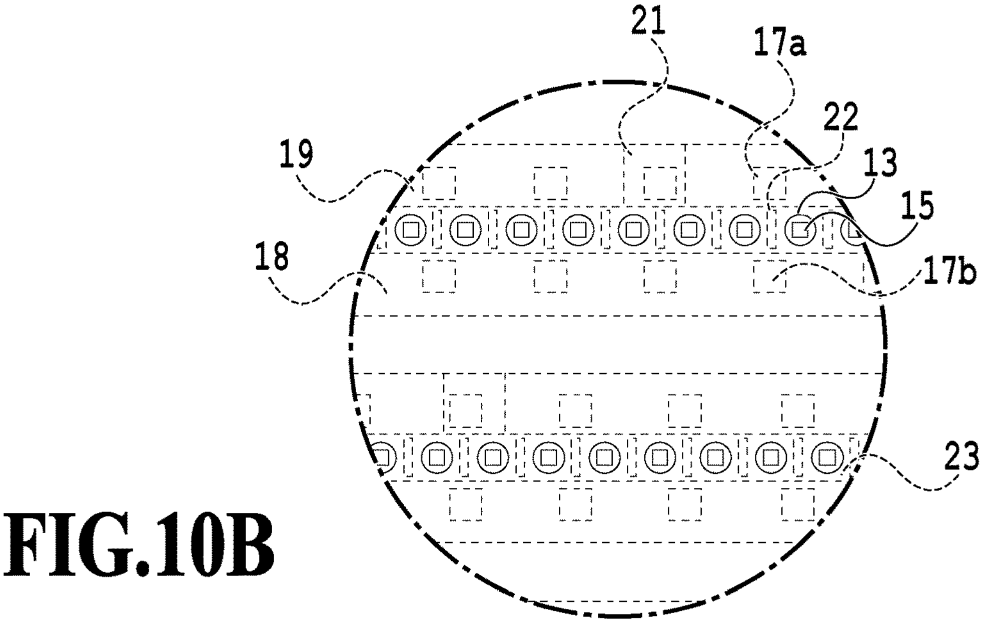
Figure 10C:
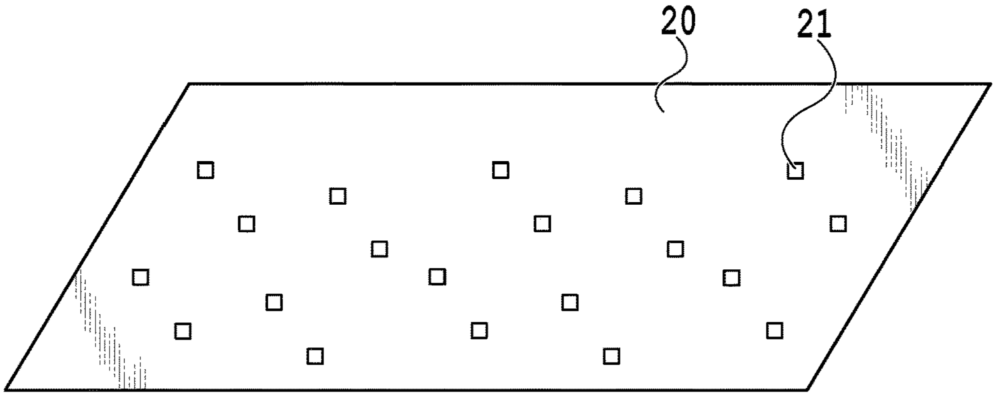
Figure 11:
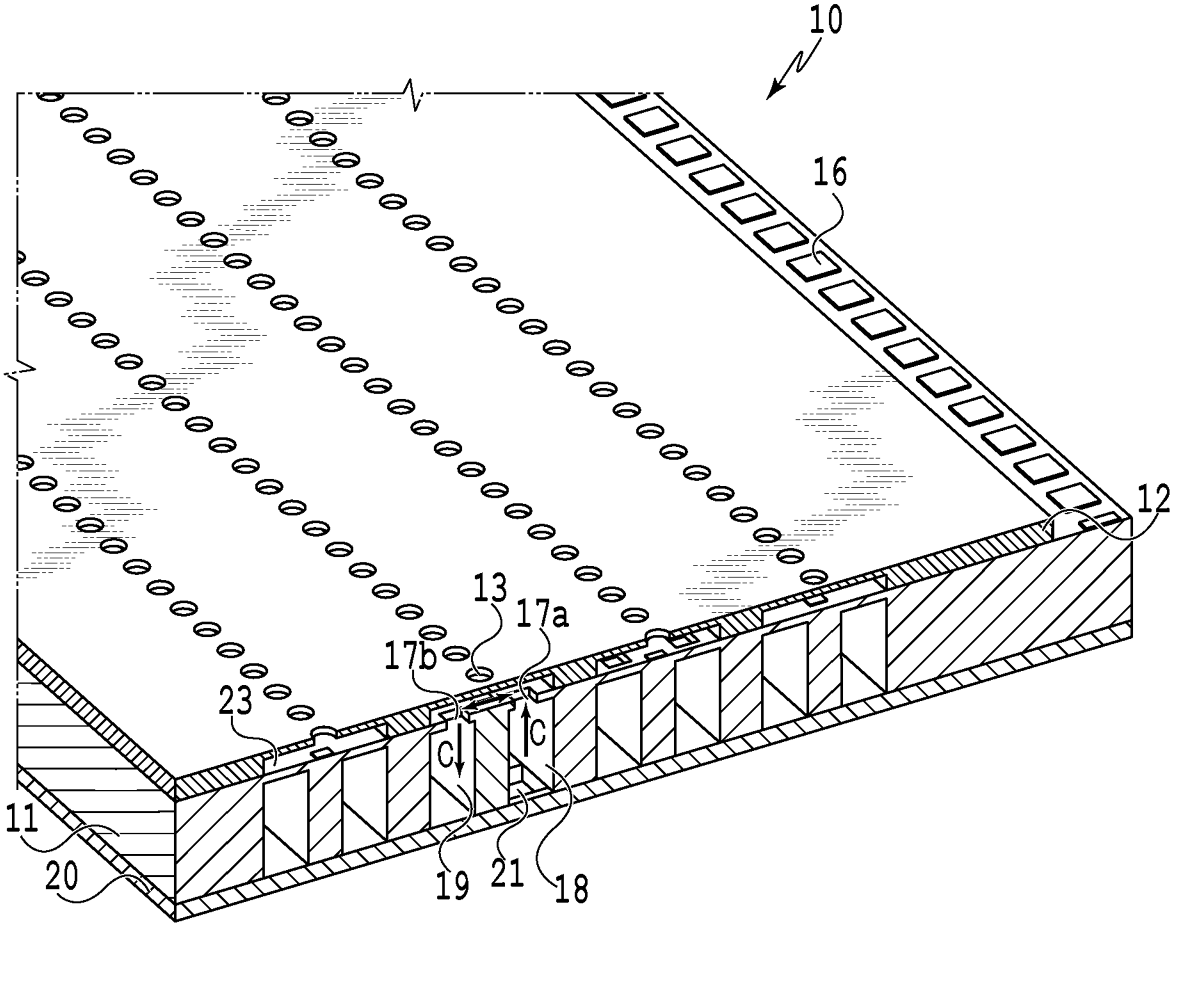
FIG. 11 is a perspective view showing the structure of the printing element substrate and a lid member along the sectional line XI-XI in FIG. 10A.

The configuration of the printing element substrate 10 of the present embodiment is described. FIG. 10A shows a plan view of a surface of the printing element substrate 10 where ejection ports 13 are formed, FIG. 10B shows a close-up view of a portion Xb in FIG. 10A, and FIG. 10C shows a plan view of the back surface of FIG. 10A. FIG. 11 is a perspective view showing a cross section of the printing element substrate 10 and a lid member 20 taken along the sectional line XI-XI shown in FIG. 10A. As shown in FIG. 10A, four ejection port arrays corresponding to the respective ink colors are formed in an ejection port formation member 12 of the printing element substrate 10. Note that a direction in which each ejection port array of a plurality of ejection ports 13 extends is hereinafter referred to as an "ejection port array direction."

As shown in FIG. 10B, the printing element 15 is disposed at a position corresponding to each ejection port 13. The printing element 15 is a heat generating element for generating a bubble in ink by use of heat energy. A pressure chamber 23 having the printing element 15 inside is defined by partitioning walls 22. The printing elements 15 are electrically connected to the terminals 16 in FIG. 10A by electric wiring (not shown) provided at the printing element substrate 10. Based on a pulse signal inputted from the control circuit in the printing apparatus 1000 via the electric wiring board 90 (FIG. 5) and the flexible wiring substrate 40 (FIG. 9B), the printing element 15 generates heat and boils ink. By the force of the bubble generated by the boiling, ink is ejected from the ejection port 13. As shown in FIG. 10B, along each ejection port array, a liquid supply channel 18 extends at one side thereof, and a liquid collection channel 19 extends at the other side thereof. The liquid supply channel 18 and the liquid collection channel 19 are flow channels provided in the printing element substrate 10, extending in the ejection port array direction and communicating with the ejection ports 13 via supply channels 17*a* and collection channels 17*b*, respectively.

As shown in FIGS. 10C and 11, the sheet-shaped lid member 20 is stacked on the back surface of the printing element substrate 10, which is opposite from the surface where the ejection ports 13 are formed, and the lid member 20 is provided with a plurality of openings 21 communicating with the liquid supply channel 18 and the liquid collection channel 19 as will be described later. In the lid member 20 of the present embodiment, three openings 21 are provided for every liquid supply channel 18, and two openings 21 are provided for every liquid collection channel 19. As shown in FIG. 10B, the openings 21 in the lid member 20 communicate with the plurality of communication ports 51 shown in FIG. 7 and the like. As shown in FIG. 11, the lid member 20 functions as a lid forming part of the walls of the liquid supply channels 18 and the liquid collection channels 19 formed in a substrate 11 of the printing element substrate 10. The lid member 20 is preferably one that has sufficient corrosion resistance to ink, and also, from the perspective of color mixing prevention, high accuracy is required for the opening shape and opening positions of the openings 21. For this reason, it is preferable to use a photosensitive resin material or a silicon plate as a material for the lid member 20 and provide the openings 21 using photolithography. In this way, the lid member converts the pitch of flow channels with the openings 21, and considering a pressure drop, it is desirable that the lid member be thin and formed of a film-shaped member.

Next, the flow of ink inside the printing element substrate 10 is described. FIG. 11 is a perspective view showing a cross section of the printing element substrate 10 and the lid member 20 taken along the sectional line XI-XI in FIG. 10A. The printing element substrate 10 has a stack of the substrate 11 formed of Si and the ejection port formation member 12 formed of a photosensitive resin, and the lid member 20 is bonded to the back surface of the substrate 11. The printing elements 15 are formed at one of the surfaces of the substrate 11 (FIG. 10B), and grooves forming the liquid supply channels 18 and the liquid collection channels 19 are formed at the other side of the substrate 11, extending in the ejection port array direction. The liquid supply channels 18 and the liquid collection channels 19 formed by the substrate 11 and the lid member 20 are connected to the shared supply flow channels 211 and the shared collection flow channels 212 in the flow channel member 210, respectively, and there is a differential pressure generated between the liquid supply channels 18 and the liquid collection channels 19. While printing is performed by ejection of ink from a plurality of ejection ports 13 of the liquid ejection head 3, at each ejection port not performing the ejection operation, the differential pressure generates a flow of ink in the liquid supply channel 18 provided in the substrate 11 as indicated by the arrow C in FIG. 11. Specifically, the ink flows through the supply port 17*a*, the pressure chamber 23, and the collection port 17*b* and then into the liquid collection channel 19. At the ejection port 13 and the pressure chamber 23 not currently performing printing, this flow allows ink thickened by evaporation from the ejection port 13, bubbles, foreign matters, and the like to be collected into the liquid collection channel 19. This also helps prevent ink in the ejection port 13 and the pressure chamber 23 from thickening. The ink collected into the liquid collection channel 19 passes through the openings 21 in the lid member 20 and the liquid communication ports 31 in the support member 30 (see FIG. 9B) and is collected in the following order: the communication ports 51 in the flow channel member 210, the individual collection flow channels 214, and the shared collection flow channel 212. This ink is collected into the supply path in the printing apparatus 1000 in the end.

In other words, ink supplied from the main body of the printing apparatus to the liquid ejection head 3 flows in the following order to be supplied and collected. First, ink flows into the liquid ejection head 3 from the liquid connection components 111 of the liquid supply unit 220. The ink then is supplied in the following order: the joint rubber 100, the communication port 72 and the shared flow channel groove 71 provided at the third flow channel member, the shared flow channel groove 62 and the communication ports 61 provided at the second flow channel member, and the individual flow channel grooves 52 and the communication ports 51 provided at the first flow channel member. After that, the ink travels through the liquid communication ports 31 provided at the support member 30, the openings 21 provided at the lid member, and the liquid supply channel 18 and the supply ports 17*a* provided at the substrate 11 in this order, and is then supplies to the pressure chambers 23. Of the ink supplied to the pressure chambers 23, ink that was not ejected from the ejection ports 13 flows in the following order: the collection ports 17*b* and the liquid collection channel 19 provided at the substrate 11, the openings 21 provided at the lid member, and the liquid communication ports 31 provided at the support member 30. After that, the ink flows in the following order: the communication ports 51 and the individual flow channel grooves 52 provided at the first flow channel member, the communication ports 61 and the shared flow channel groove 62 provided at the second flow channel member, the shared flow channel groove 71 and the communication port 72 provided at the third flow channel member, and the joint rubber 100. Further, the ink flows from the liquid connection components 111 provided at the liquid supply unit to the outside of the liquid ejection head 3. In the mode employing the first circulation path shown in FIG. 2, the ink flowing from the liquid connection components 111 travels through the negative pressure control unit 230 and is then supplied to the joint rubber 100. In the mode of the second circulation path shown in FIG. 3, ink collected from the pressure chambers 23 travels through the joint rubber 100 and then flows to the outside of the liquid ejection head from the liquid connection components 111 via the negative pressure control unit 230.

Also, as shown in FIGS. 2 and 3, not all the ink flowing in from one end of the shared supply flow channel 211 of the liquid ejection unit 300 is supplied to the pressure chambers 23 via the individual supply flow channels 213*a*. Part of the ink does not flow into the individual supply flow channels 213*a* and flows to the liquid supply unit 220 from the other end of the shared supply flow channel 211. Thus having a path for ink to flow without passing through the printing element substrate 10 can help prevent backward flow of circulating ink even in a case where the printing element substrate 10 has thin flow channels with high flow resistance like in the present embodiment. In this way, the liquid ejection head of the present embodiment can reduce thickening of ink in the pressure chambers and near the ejection ports, and in turn can help prevent ink from being ejected in an incorrect direction or not ejected at all. As a result, a high-quality image can be printed.

<Positional Relations Between the Printing Element Substrates>

Figure 12:
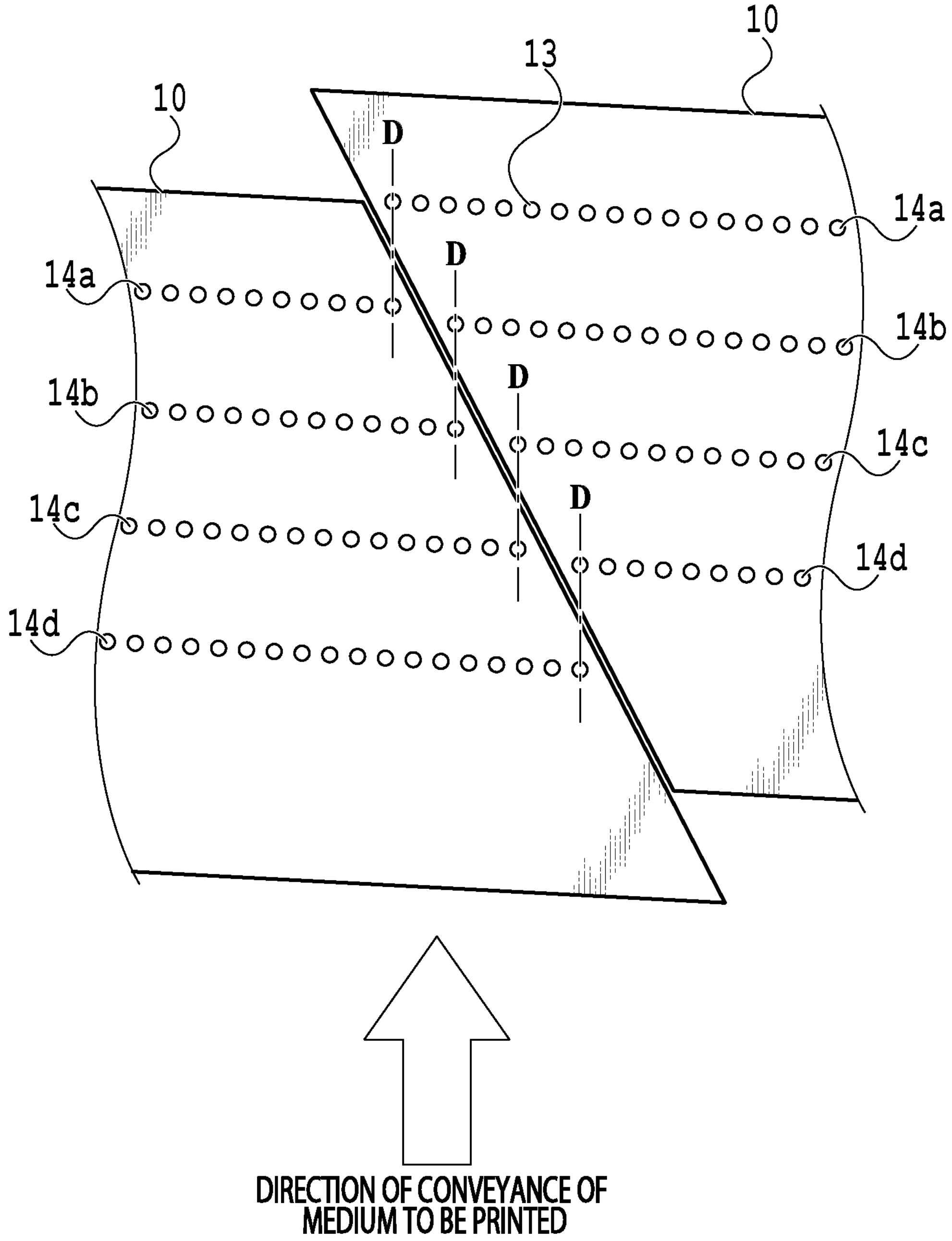
FIG. 12 is a plan view showing a close-up of a portion of adjacent printing element substrates.

FIG. 12 is a plan view showing a close-up of a portion of two adjacent ejection modules where their respective printing element substrates are adjacent to each other. As shown in FIG. 10A and the like, the printing element substrates used in the present embodiment are substantially a parallelogram in shape. As shown in FIG. 12, in each printing element substrate 10, the ejection port arrays (14*a* to 14*d*) each being an array of ejection ports 13 are arranged to be slanted at a certain angle relative to the printing medium conveyance direction. Thus, at a portion where the printing element substrates 10 are adjacent to each other, at least one ejection port of each ejection port array overlaps with an ejection port of an ejection port array in an adjacent printing element substrate 10 in the printing medium conveyance direction. In FIG. 12, two ejection ports on the line D overlap. This arrangement makes it possible that even in a case where the position of the printing element substrate 10 is slightly displaced from a predetermined position, black streaks and white voids on printed images can be made less noticeable through control of driving of the overlapping ejection ports. The configuration in FIG. 12 can be employed also in a case where the plurality of printing element substrates 10 are arranged not in a staggered manner, but on a straight line (in-line). Then, measures against black streaks and white voids at the connection portion between the printing element substrates 10 can be provided, and at the same time, the length of the liquid ejection head can be reduced in the printing medium conveyance direction. Although the main surface of the printing element substrate is a parallelogram in shape here, it is to be noted that the present embodiment is not limited to this. The configuration of the present embodiment can be favorably applied even to a case where the printing element substrates used have other shapes, such as, for example, rectangles, trapezoids, or the like.

<Structure of the Thermal Action Unit of the Printing Element Substrate>

Figure 13A:
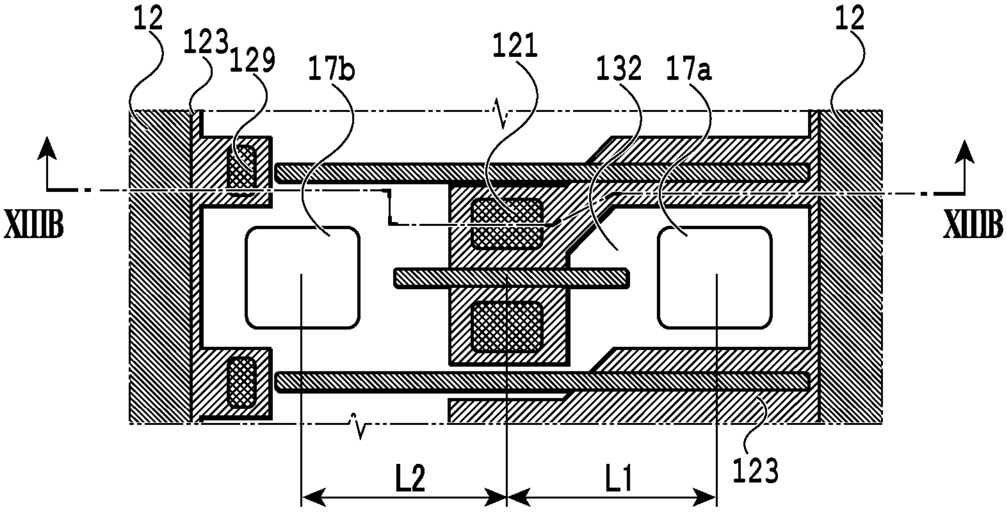
FIGS. 13A and 13B are diagrams showing the structure of a thermal action unit in the printing element substrate.
Figure 13B:
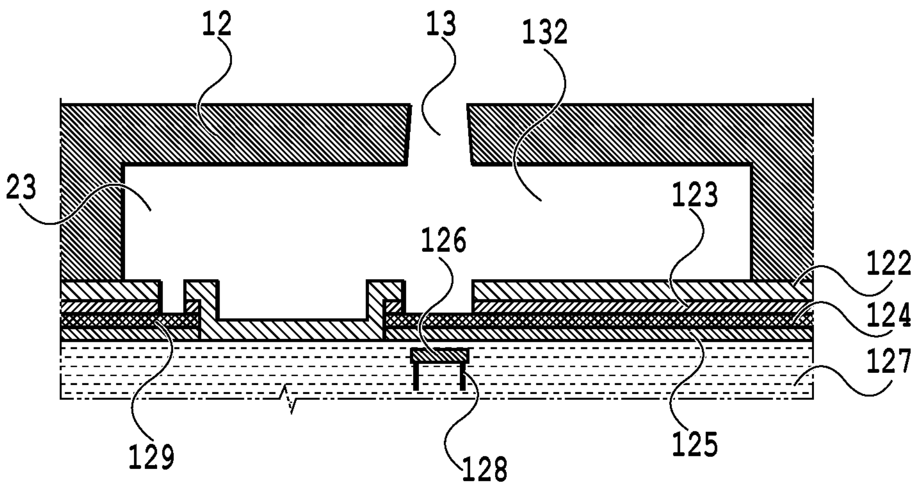

The structure of the thermal action unit of the printing element substrate according to the present embodiment is described below using FIGS. 13A and 13B. FIG. 13A is a plan view schematically showing a close-up of the thermal action unit of the printing element substrate 10, and FIG. 13B is a sectional view taken along the dot-dash line XIIIb-XIIIb in FIG. 13A.

In the liquid ejection head, a substrate for liquid ejection printing is formed by stacking a plurality of layers on a base 121 formed of silicon. In the present embodiment, a heat storing layer formed of a thermally oxidized film, a SiO film, a SiN film, or the like is placed on the base 121. Also, a heat generating resistor 126 is disposed on the heat storing layer, and an electrode wiring layer (not shown) as wiring formed of a metal material such as Al, Al—Si, or Al—Cu is connected to the heat generating resistor 126 via a tungsten plug 128. As shown in FIG. 13B, an insulating protective layer 127 is disposed on the heat generating resistor 126. The insulating protective layer 127 is an insulating layer provided at the upper side of the heat generating resistor 126, covering the heat generating resistor 126. The insulating protective layer 127 is formed of a SiO film, a SiN film, or the like. Note that, as shown in FIG. 13A and the like, the thermal action unit of the present embodiment has an electrothermal conversion element (also referred to as a heater, a heat generating element, or the like), and the electrothermal conversion element has at least the heat generating resistor 126.

On the insulating protective layer 127, a protective layer is disposed to block a contact between liquid and the electrothermal conversion element. This protective layer is formed of a lower protective layer 125, an upper protective layer 124, and an adherence protective layer 123 and protects the surface of the heat generating resistor 126 from chemical and physical impact caused by the heating of the heat generating resistor 126.

In the present embodiment, the lower protective layer 125 is formed of tantalum (Ta), the upper protective layer 124 is formed of iridium (Ir), and the adherence protective layer 123 is formed of tantalum (Ta). The protective layer formed of these materials has conductivity. A protective layer 122 is disposed on the adherence protective layer 123 to be resistant to liquid and to have improved adherence to the ejection port formation member 12. The protective layer 122 is formed of SiC. The upper protective layer 124 contains metal that, upon having an electrochemical reaction with liquid, dissolves into the liquid and is formed of a material that, upon being heated, does not form an oxide film that hinders the dissolution.

In ejection of liquid, the upper protective layer 124 whose upper portion is in contact with liquid is in a harsh environment because cavitation occurs at the upper portion due to an instantaneous rise in the temperature of the liquid and generation and burst of a bubble. Thus, in the present embodiment, the upper protective layer 124 formed of an iridium material with high corrosion resistance and high reliability is formed at a position corresponding to the heat generating resistor 126 (above the heat generating resistor 126) and is in contact with liquid.

The present embodiment employs the following ink circulation configuration in the pressure chamber 23: liquid is supplied from the supply port 17*a* and is collected into the collection port 17*b*. Thus, during printing, liquid is flowing above the heat generating resistor 126 from the supply port 17*a* at the upstream side toward the collection port 17*b* at the downstream.

The present embodiment performs a process for removing burnt-on deposits accumulating on the upper protective layer 124 of the heater in a case where the upper protective layer 124 is formed of iridium. More specifically, an electrochemical reaction is caused using a portion of the upper protective layer 124 immediately above the heat generating resistor 126 as one of electrodes, so that the upper protective layer 124 dissolves into the ink. In this way, the burnt-on deposits accumulating on the upper protective layer 124 can be removed. The liquid ejection head thus has a cleaning unit by which burned-on deposits accumulating on the upper protective layer 124 are removed to allow the surface layer of the heater to have no or little burnt-on deposits.

However, because removing burned-on deposits as described above creates a state where there is no or little burned-on deposits on the surface layer of the heater, ejection characteristics tend to change significantly. Thus, to overcome this problem, the present embodiment performs an aging process (hereinafter referred to simply as aging) after the removal of burned-on deposits so as to be able to stabilize ejection. Note that aging as referred to in the present embodiment is preliminary liquid ejection not contributing to printing of an image (what is called preliminary ejection).

Figure 14A:
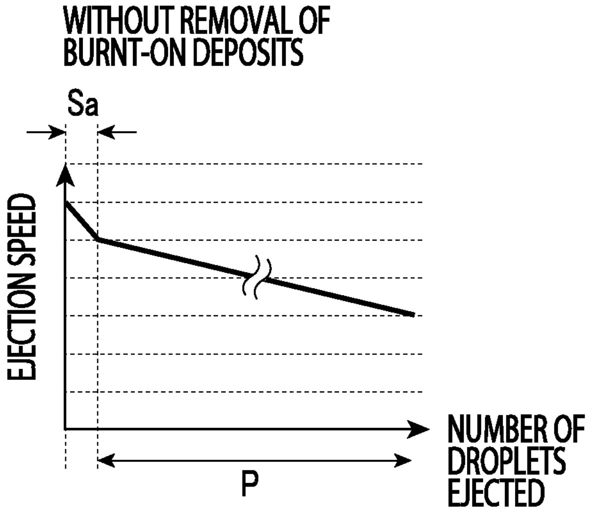
FIGS. 14A and 14B show the relation between the number of droplets ejected and the ejection speed.
Figure 14B:
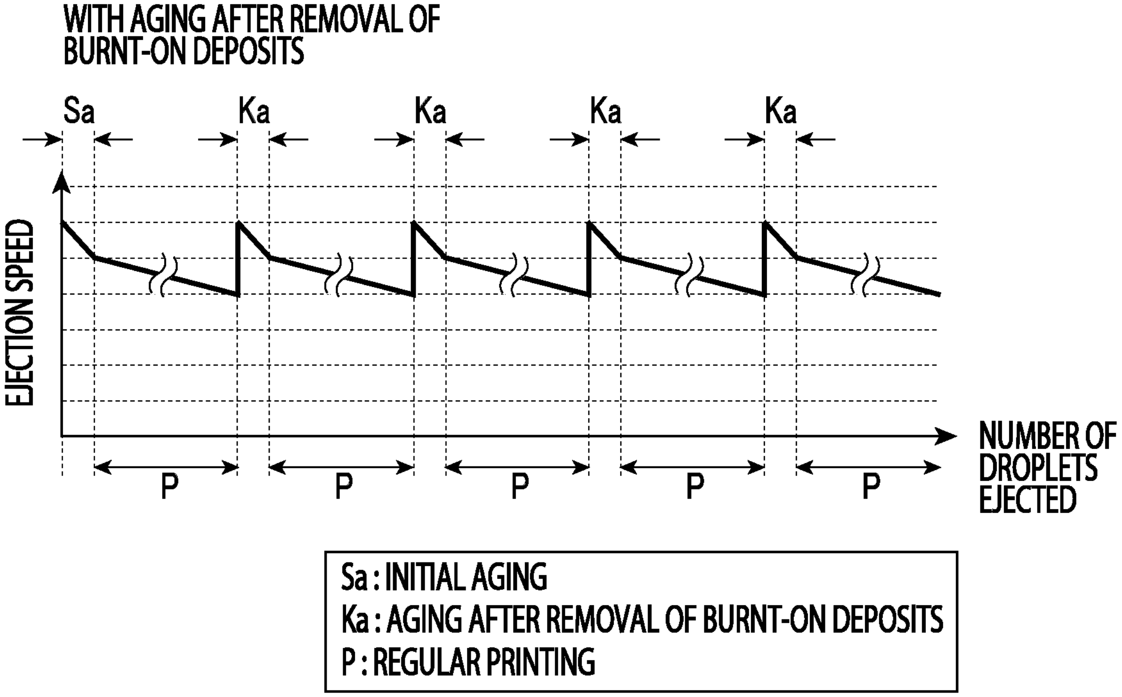

FIG. 14A is a diagram showing changes in ejection speed in a case where the removal of burned-on deposits is not performed, and FIG. 14B is a diagram showing changes in ejection speed in a case where the removal of burned-on deposits is performed during use.

FIG. 14A shows a case where aging is performed after a new liquid ejection head is attached and then regular printing is performed afterwards. In this case, as burned-on deposits keep accumulating on the heater, the ejection speed gently slows down, which eventually causes image degradation and causes the heater to reach its limit of use.

By contrast, as shown in FIG. 14B, after a certain amount of burned-on deposits accumulates on the heater as regular printing is performed, the burnt-on deposits are removed, and aging is performed again. Then, ejection speed suitable for printing can be restored, and consequently, the life of the heater can be extended.

In the present embodiment, as the cleaning unit by which to remove burnt-on deposits, a portion of the upper protective layer 124 of the heater immediately above the heat generating resistor 126 may be used as one electrode, and the other one may be grounded. Alternatively, an opposite electrode 129 may be provided. Also, suction recovery may be performed after the removal of burned-on deposits and before the aging.

In regards to control of the amount of burnt-on deposits in aging, it is preferable to do the control using the number of droplets ejected (also called a dot count).

Note that in the preliminary ejection for aging, ink may be ejected to a printing medium such as paper, but in a case where ink not contributing to printing of an image is used, it is preferable to use a unit capable of recovering the ejection performance (referred to as a recovery unit). Specifically, like in a regular preliminary ejection operation, ink is ejected to a dedicated ink receiver or cap forming the recovery unit. Then, after aging, suction recovery may be performed using the recovery unit.

Note that a determination as to whether aging has been properly performed may be made by, for example, printing an image with a uniform density as a test and checking the density of the outputted image. As this density checking unit, a density sensor provided at the main body of the printing apparatus may be used, or the checking may be done visually.

<Control of Communications Between the Liquid Ejection Head and the Main Body>

Figure 17:
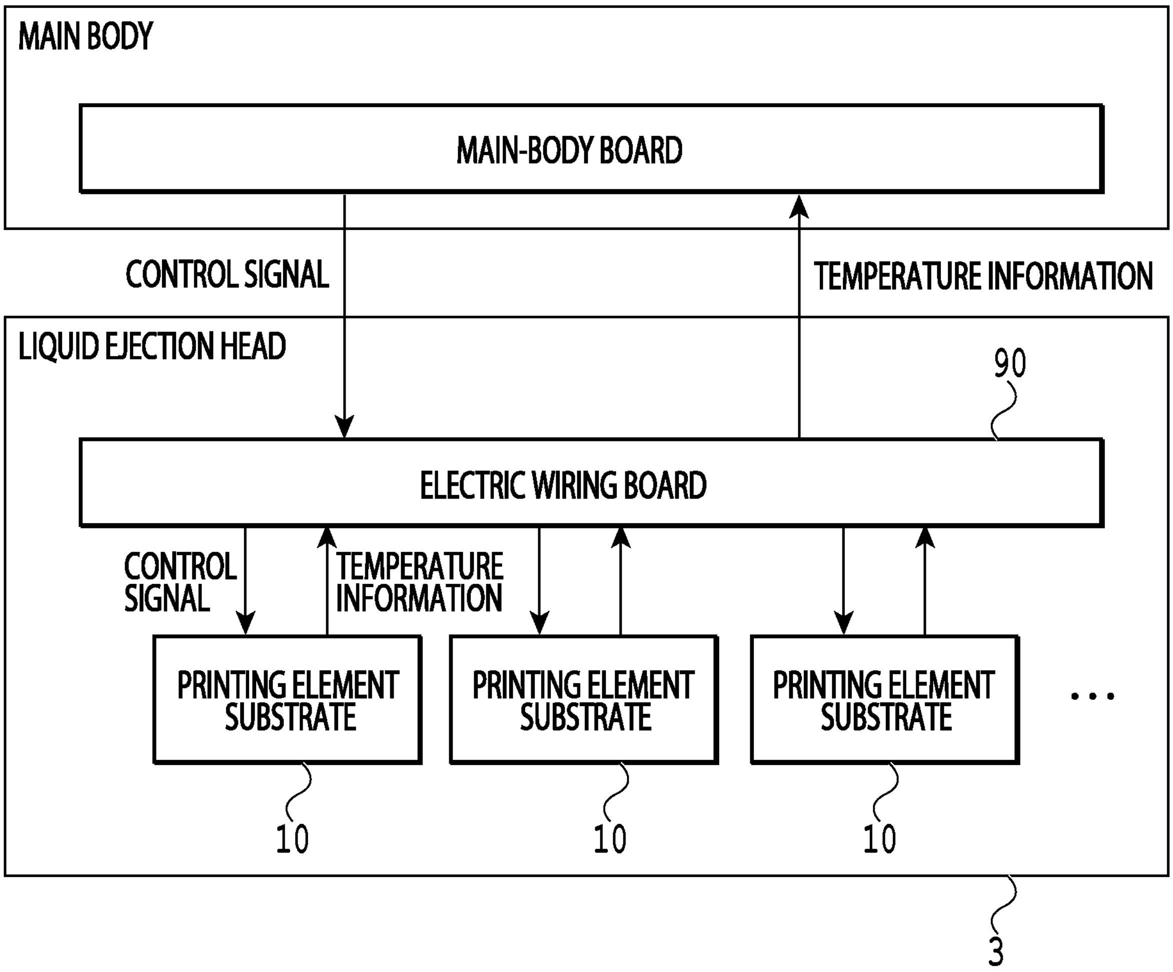
FIG. 17 is a block diagram in which communications between the liquid ejection head and the main body of the printing apparatus are modeled.

Control of communications between the liquid ejection head and the main body according to the present embodiment is described below using FIG. 17. FIG. 17 is a block diagram in which communications between the liquid ejection head and the main body are modeled. A main-body board built in the main body of the printing apparatus 1000 has a CPU, a ROM, a RAM, and the like. This main body substrate receives temperature information on each printing element substrate 10 from the liquid ejection head 3 and based on the temperature information received, transmits a control signal for driving each printing element substrate 10 to the electric wiring board 90 of the liquid ejection head 3.

<Steps of Procedure of Processing>

Figure 16:
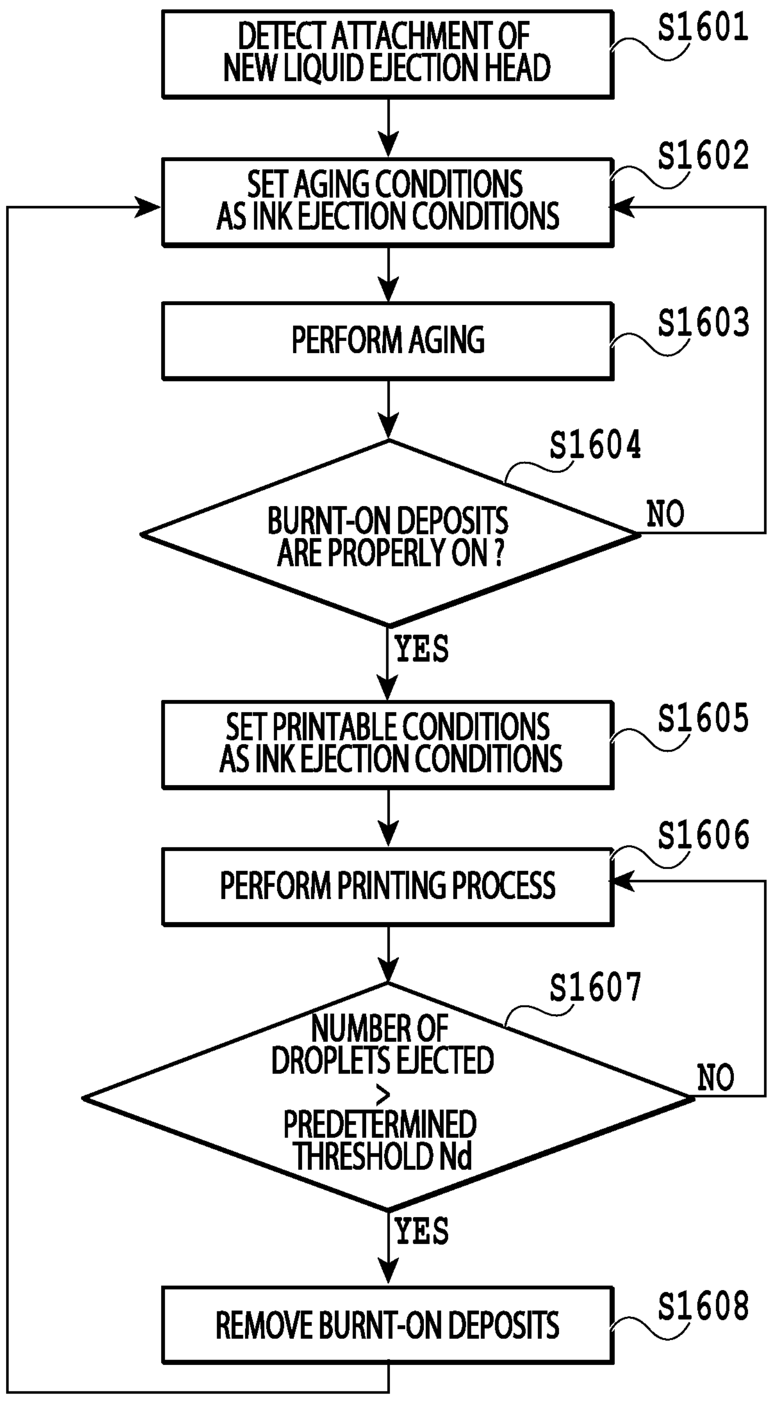
FIG. 16 is a flowchart of processing in a first embodiment.

Now, FIG. 16 is referred to. FIG. 16 relates to an example of a procedure of processing in the present embodiment and is a flowchart showing its steps. In this procedure of processing, initial aging is performed on a new liquid ejection head in a printing apparatus with no ejection history, and after the initial aging, printing is performed. Then, once the number of droplets ejected reaches a predetermined threshold, burnt-on deposits on the upper protective layer of the heaters are removed, and then, aging (preliminary ink ejection processing) is performed again. The following describes specific steps in detail.

In Step S1601, the CPU of the printing apparatus 1000 detects that a new liquid ejection head with no ejection history has been attached to the main body of the printing apparatus. The detection in this step may be done automatically by the CPU of the printing apparatus 1000 by, e.g., using a sensor or may be done based on an input by a user who completed the attachment. Note that "Step S####" will hereinafter be written simply as "S####."

In S1602, as conditions for ink ejection processing (hereinafter referred to as ink ejection conditions), the CPU of the printing apparatus 1000 sets conditions for preliminary ink ejection processing (hereinafter also referred to as aging conditions). If the CPU proceeds to this step from S1601, conditions set as the aging conditions in this step are conditions for initial aging for the initial state immediately after the attachment of the head (referred to as first conditions). If the CPU proceeds to this step from S1604, conditions set as the aging conditions in this step are conditions for attaching a predetermined amount of burnt-on deposits in order to attach burnt-on deposits in stages (referred to as second conditions). Further, in a case where the CPU proceeds to this step from S1608, conditions set as the aging conditions in this step are conditions for aging after removal of burnt-on deposits for a state after removal of burnt-on deposits (referred to as third conditions).

Note that specific conditions for preliminary ink ejection processing may include, e.g., the amount of liquid ejected from a single nozzle in one shot of ejection, the number of times of ejection, the interval of ejection, the ejection frequency, voltage for the heat generating elements, and the length of time for applying voltage to the heat generating elements.

In S1603, the CPU of the printing apparatus 1000 performs aging.

In S1604, the CPU of the printing apparatus 1000 determines whether the upper protective layer of the heaters have burnt-on deposits thereon properly. If the result of the determination in this step is YES, the processing proceeds to S1605, and if the result of the determination is NO, the processing proceeds back to S1602. Note that this step employs the test print method described above, i.e., prints an image with a uniform density as a test and checks the density of the outputted image. More specifically, the CPU performs the determination in this step by obtaining measured densities by checking the densities of the outputted image printed as a test and determining whether the obtained measured densities are within a predetermined range. It is deemed that burnt-on deposits have properly attached if the measured densities are within a predetermined range, and it is deemed that burnt-on deposits have not properly attached if the measured densities are not within a predetermined range.

In S1605, the CPU of the printing apparatus 1000 sets conditions for enabling printing (hereinafter also referred to as printable conditions) as ink ejection conditions.

In S1606, the CPU of the printing apparatus 1000 performs a printing process.

In S1607, the CPU of the printing apparatus 1000 determines whether the number of droplets ejected is larger than a predetermined threshold (Nd). If the result of the determination in this step is YES, it is deemed that the amount of burnt-on deposits on the upper protective layer of the heaters has exceeded an acceptable value, and the processing proceeds to S1608. Meanwhile, if the result of the determination of this step is NO, the processing proceeds back to S1606 to continue the printing under the same settings.

In S1608, the CPU of the printing apparatus 1000 performs removal of burnt-on deposits.

After the removal of burnt-on deposits in S1608, there are almost no burnt-on deposits on the upper protective layer of the heaters because the burnt-on deposits have been removed. Thus, the processing proceeds to S1602 and then to S1603. Specifically, aging is performed again based on predetermined aging conditions.

Note that aging (S1603) can be performed repeatedly until all the upper protective layer 124 dissolves due to an electrochemical reaction.

Second Embodiment

<Structure of the Thermal Action Unit of the Printing Element Substrate>

Figure 15:
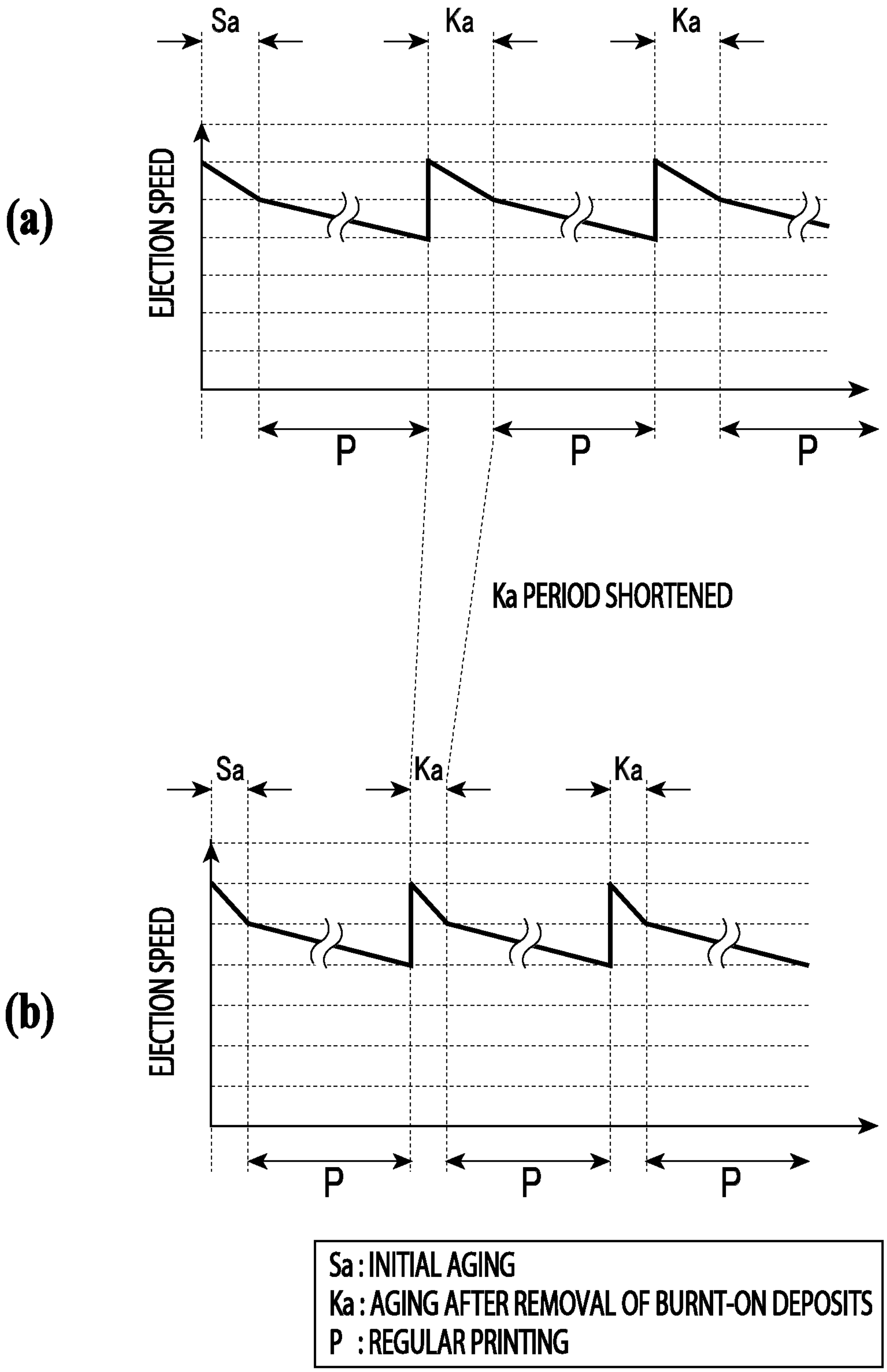
FIG. 15 shows the relation between the ejection speed and the number of droplets ejected.

A second embodiment is a mode where heater voltage in aging is changed in order for aging to be carried out quickly after removal of burnt-on deposits as shown by reference sign (b) in FIG. 15. Note that the following description focuses mainly on differences from the first embodiment and omits descriptions of matters similar to the first embodiment where appropriate.

Now, a part of FIG. 15 denoted by reference sign (a) is referred to. The part of FIG. 15 denoted by reference sign (a) shows a case in the first embodiment where VpH is the same as VaH, where VpH is the voltage applied to the heat generating elements in printing, which is one of the printing conditions, and VaH is the voltage applied to the heat generating elements in aging, which is one of the conditions for aging after removal of burned-on deposits. In this case, the aging takes time, which increases down-time for the printing apparatus and wasted ink.

In view of this increase, the present embodiment is characterized in that VaH≠VpH in order for the aging to be carried out quickly. Especially in a case where the voltage in aging is higher than that in printing (VaH>VpH), ejection change in aging can be accelerated.

Note that the value of the voltage VaH in aging after removal of burnt-on deposits may be the same as or different from the value used in initial aging on a new head with no ejection history.

Third Embodiment

<Structure of the Thermal Action Unit of the Printing Element Substrate>

A third embodiment is a mode where a length of time for applying the heater voltage in aging is changed in order for the aging to be carried out quickly after removal of burnt-on deposits. Note that the following description focuses mainly on differences from the first or second embodiment and omits descriptions of matters similar to the first or second embodiment where appropriate.

In order for the aging to be carried out quickly, the present embodiment is characterized in that Pta≠Ptp, where Pta is a length of time for applying voltage to the heat generating elements in aging and Ptp is a length of time for applying voltage to the heat generating elements in printing. Especially in a case where the length of time of the application in aging is longer than that in printing (Pta>Ptp), ejection change in aging can be accelerated.

Note that the value of the length of time Pta of the voltage application in aging after removal of burnt-on deposits may be the same as or different from the value used in initial aging on a new head with no ejection history.

Fourth Embodiment

<Structure of the Thermal Action Unit of the Printing Element Substrate>

A fourth embodiment is a mode where the in-chip temperature in aging is changed in order for the aging to be carried out quickly after removal of burnt-on deposits. Note that the following description focuses mainly on differences from the first or second embodiment and omits descriptions of matters similar to the first or second embodiment where appropriate.

In order for the aging to be carried out quickly, the present embodiment is characterized in that Ta≠Tp, where Ta is the in-chip temperature in aging and Tp is the in-chip temperature in printing. Especially in a case where Ta>Tp, ejection change in aging can be accelerated.

Note that the in-chip temperature Ta in aging after removal of burnt-on deposits may be the same as or different from the value used in initial aging on a new head with no ejection history.

Also, increasing the in-chip temperature may be done by the head's temperature adjustment or by utilizing temperature rise caused by an increase in ejection frequency.

Fifth Embodiment

<Structure of the Thermal Action Unit of the Printing Element Substrate>

A fifth embodiment is a mode where the ejection frequency in aging is changed in order for the aging to be carried out quickly after removal of burnt-on deposits. Note that the following description focuses mainly on differences from the first or second embodiment and omits descriptions of matters similar to the first or second embodiment where appropriate.

In order for the aging to be carried out quickly, the present embodiment is characterized in that Fa≠Fp, where Fa is the ejection frequency in aging and Fp is the ejection frequency in printing. Especially in a case where Fa>Fp, ejection change in aging can be accelerated.

Note that for the ejection frequency Fa in aging after removal of burnt-on deposits, the same value as or a value different from the value used in initial aging on a new head with no ejection history.

Sixth Embodiment

<Structure of the Thermal Action Unit of the Printing Element Substrate>

A sixth embodiment is a mode where the liquid ejected in aging is changed in order for the aging to be performed quickly after removal of burnt-on deposits. Specifically, although ink for printing is used in aging as liquid for preliminary ejection in the embodiments described above, in the present embodiment, the liquid is changed to liquid which allows the aging to be carried out quickly. Note that the following description focuses mainly on differences from the first or second embodiment and omits descriptions of matters similar to the first or second embodiment where appropriate.

In order for the aging to be carried out quickly, in the present embodiment, liquid ejected in aging is changed to liquid dedicated for aging which allows the aging process to be completed faster than ink. Such liquid is characterized by the property of burning and sticking more easily than ink contributing to printing.

Note that the dedicated liquid used in aging after removal of burnt-on deposits to promote aging may be the same as or different from the liquid used in initial aging on a new head with no ejection history.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The embodiments of the present disclosure may also be realized by a circuit (e.g., an ASIC) that implements one or more functions. Note that the first to sixth embodiments may be combined appropriately. Also, aging after removal of burnt-on deposits in the first to sixth embodiments can be repeatedly performed as long as the cleaning unit for removal of burnt-on deposits is effective.

The present disclosure can obtain stable ejection characteristics after removal of burnt-on deposits.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-204293, filed Dec. 21, 2022, which is hereby incorporated by reference herein in its entirety.

What is claimed is:

1. A liquid ejection apparatus comprising:

a liquid ejection head comprising (1) an ejection port from which to eject liquid, (2) a thermal action unit having a heat generating element for generating energy required to eject the liquid, and (3) a first protective layer provided to block a contact between the thermal action unit and the liquid and formed of a material containing metal that dissolves into the liquid by having an electrochemical reaction with the liquid; and a control unit configured to (1) perform a cleaning process to remove burnt-on deposits accumulating on the first protective layer by dissolving the first protective layer through an electrochemical reaction and (2) perform an aging process to accumulate burnt-on deposits onto the first protective layer after the cleaning process.

2. The liquid ejection apparatus according to claim 1, wherein the aging process is preliminary ejection not contributing to printing on a printing medium.

3. The liquid ejection apparatus according to claim 2, wherein a liquid preliminarily ejected in the aging process is ink ejected to print on the printing medium.

4. The liquid ejection apparatus according to claim 2, wherein a liquid preliminarily ejected in the aging process is a dedicated liquid different from ink ejected to print on the printing medium, and wherein the dedicated liquid completes the aging process faster than the ink.

5. The liquid ejection apparatus according to claim 4, wherein the dedicated liquid burns and sticks more easily than the ink.

6. The liquid ejection apparatus according to claim 5, wherein the first protective layer is formed of a material that, upon being heated, does not form an oxide film that hinders the dissolution of the first protective layer.

7. The liquid ejection apparatus according to claim 1, further comprising a recovery unit configured to recover ejection performance of the ejection port, wherein part of the recovery unit is used for the preliminary ejection.

8. The liquid ejection apparatus according to claim 7, wherein the heat generating element has a heat generating resistor, and wherein in the cleaning process, the control unit causes the first protective layer to dissolve by causing an electrochemical reaction using a portion of the first protective layer immediately above the heat generating resistor as an electrode.

9. The liquid ejection apparatus according to claim 7, wherein $VaH \neq VpH$ is satisfied, where VaH is voltage applied to the heat generating element in the aging process and VpH is voltage applied to the heat generating element in printing.

10. The liquid ejection apparatus according to claim 9, wherein $VaH > VpH$ is satisfied.

11. The liquid ejection apparatus according to claim 7, wherein $Pta \neq Ptp$ is satisfied, where Pta is a length of time for applying voltage to the heat generating element in the aging process and Ptp is a length of time for applying voltage to the heat generating element in printing.

12. The liquid ejection apparatus according to claim 11, wherein $Pta > Ptp$ is satisfied.

13. The liquid ejection apparatus according to claim 7, wherein $Ta \neq Tp$ is satisfied, where Ta is an in-chip temperature in the aging process and Tp is an in-chip temperature in printing.

14. The liquid ejection apparatus according to claim 13, wherein $Ta > Tp$ is satisfied.

15. The liquid ejection apparatus according to claim 7, wherein $Fa \neq Fp$ is satisfied, where Fa is ejection frequency in the aging process and Fp is ejection frequency in printing.

16. The liquid ejection apparatus according to claim 15, wherein $Fa > Fp$ is satisfied.

17. The liquid ejection apparatus according to claim 1, wherein the aging process is repeatable until all of the first protective layer dissolves due to an electrochemical reaction.

18. A method for controlling a liquid ejection apparatus including (A) a liquid ejection head comprising (1) an ejection port from which to eject liquid, (2) a thermal action unit having a heat generating element for generating energy required to eject the liquid, and (3) a first protective layer provided to block a contact between the thermal action unit and the liquid and formed of a material containing metal that dissolves into the liquid by having an electrochemical reaction with the liquid and (B) a control unit, the method comprising causing the control unit to execute:

performing a cleaning process to remove burnt-on deposits accumulating on the first protective layer by dissolving the first protective layer through an electrochemical reaction; and performing an aging process to accumulate burnt-on deposits onto the first protective layer after the cleaning process.

19. A non-transitory computer-readable storage medium storing a program for causing a computer to execute a method for controlling a liquid ejection apparatus, the liquid ejection apparatus including (A) a liquid ejection head comprising (1) an ejection port from which to eject liquid, (2) a thermal action unit having a heat generating element for generating energy required to eject the liquid, and (3) a first protective layer provided to block a contact between the thermal action unit and the liquid and formed of a material containing metal that dissolves into the liquid by an electrochemical reaction with the liquid and (B) a control unit, the method comprising causing the control unit to execute:

performing a cleaning process to remove burnt-on deposits accumulating on the first protective layer by dissolving the first protective layer through an electrochemical reaction; and performing an aging process to accumulate burnt-on deposits onto the first protective layer after the cleaning process.

* * * * *